(12) United States Patent
Kumar et al.

(10) Patent No.: US 11,949,370 B2
(45) Date of Patent: Apr. 2, 2024

(54) SUPPORT FRAMES FOR SOLAR TRACKERS

(71) Applicant: Nextracker LLC, Fremont, CA (US)

(72) Inventors: Phani Kumar, Hyderabad (IN);
Abhimanyu Sable, Hyderabad (IN);
Jitendra Morankar, Telangana (IN);
Alexander W. Au, Oakland, CA (US);
David Kresse, Walnut Creek, CA (US)

(73) Assignee: NEXTRACKER LLC, Fremont, CA (US)

( * ) Notice: Subject to any disclaimer, the term of this patent is extended or adjusted under 35 U.S.C. 154(b) by 63 days.

(21) Appl. No.: 17/475,011

(22) Filed: Sep. 14, 2021

(65) Prior Publication Data

US 2022/0085753 A1 Mar. 17, 2022

Related U.S. Application Data

(60) Provisional application No. 63/235,272, filed on Aug. 20, 2021, provisional application No. 63/078,228, filed on Sep. 14, 2020.

(51) Int. Cl.
*H02S 30/10* (2014.01)
*F16M 11/20* (2006.01)
*H02S 20/32* (2014.01)

(52) U.S. Cl.
CPC ......... *H02S 30/10* (2014.12); *F16M 11/2021* (2013.01); *H02S 20/32* (2014.12)

(58) Field of Classification Search
CPC ........ Y02E 10/47; Y02E 10/50; F24S 30/425; F24S 25/70; F16M 11/2021; H02S 20/30; H02S 20/32; H02S 30/10
See application file for complete search history.

(56) References Cited

U.S. PATENT DOCUMENTS

| | | |
|---|---|---|
| 2,234,907 A | 3/1941 | Williams |
| 3,148,739 A | 9/1964 | Mattingly et al. |
| 3,645,055 A | 2/1972 | Roza |
| 3,830,315 A | 8/1974 | Love |
| 3,896,890 A | 7/1975 | Gale |
| 4,334,392 A | 6/1982 | Dziedzic |
| RE32,076 E | 2/1986 | Dziedzic |
| 4,650,372 A | 3/1987 | Gorrell |
| 4,697,648 A | 10/1987 | Brandt |
| 4,707,964 A | 11/1987 | Hoyt et al. |

(Continued)

FOREIGN PATENT DOCUMENTS

| | | |
|---|---|---|
| WO | 1999014441 A1 | 3/1999 |
| WO | 2000061314 A1 | 10/2000 |

(Continued)

OTHER PUBLICATIONS

International Search Report and Written Opinion of the International Application No. PCT/US2021/050290, dated Feb. 4, 2022, 10 pg.

*Primary Examiner* — Patrick D Hawn
(74) *Attorney, Agent, or Firm* — Fredrikson & Byron, P.A.

(57) ABSTRACT

A pier for a solar tracking system includes a bearing housing assembly, a frame, the frame defining an A-profile having a pair of legs and a crown at a center portion thereof, and a mounting bracket, the mounting bracket coupled to a portion of the crown of the frame at a first portion thereof and coupled to a portion of the bearing housing assembly at a second portion thereof.

13 Claims, 22 Drawing Sheets

(56) References Cited

U.S. PATENT DOCUMENTS

| | | | |
|---|---|---|---|
| 4,832,001 A | 5/1989 | Baer | |
| 5,408,788 A | 4/1995 | Hamilton et al. | |
| 5,575,122 A | 11/1996 | Hamilton et al. | |
| 5,707,180 A | 1/1998 | Vickars et al. | |
| 5,791,820 A | 8/1998 | Rempel | |
| 6,659,692 B1 | 12/2003 | May | |
| 6,665,990 B1 | 12/2003 | Cody et al. | |
| 7,018,139 B1 | 3/2006 | Slemons | |
| 7,090,437 B2 | 8/2006 | Pinkleton | |
| 7,314,335 B2 | 1/2008 | Whitsett | |
| 7,338,232 B2 | 3/2008 | Nasr | |
| 7,510,350 B2 | 3/2009 | Ronnkvist | |
| D612,954 S | 3/2010 | Perko | |
| 7,731,454 B1 | 6/2010 | Watson, III et al. | |
| 7,914,236 B2 | 3/2011 | Neville | |
| 8,240,109 B2 | 8/2012 | Cusson et al. | |
| 8,256,169 B2 | 9/2012 | Cusson et al. | |
| 8,274,028 B2 * | 9/2012 | Needham | F24S 30/425 136/246 |
| 8,316,590 B2 | 11/2012 | Cusson | |
| 8,353,655 B2 | 1/2013 | Rainer | |
| 8,367,961 B2 | 2/2013 | Rainer | |
| 8,407,949 B2 | 4/2013 | Kellner | |
| 8,464,496 B2 | 6/2013 | Cusson et al. | |
| 8,506,207 B2 | 8/2013 | Lutenegger et al. | |
| 8,609,977 B2 | 12/2013 | Jones et al. | |
| 8,650,812 B2 | 2/2014 | Cusson | |
| 8,671,930 B2 | 3/2014 | Liao | |
| 8,721,226 B2 | 5/2014 | Baumsteiger | |
| 8,821,074 B2 | 9/2014 | Reid et al. | |
| 8,839,573 B2 | 9/2014 | Cusson et al. | |
| 8,845,236 B1 | 9/2014 | Dosdourian et al. | |
| 8,991,108 B1 | 3/2015 | Zamrzla | |
| 9,010,042 B2 | 4/2015 | Anderson et al. | |
| 9,133,595 B2 | 9/2015 | Wilson et al. | |
| 9,188,366 B2 | 11/2015 | Thurner et al. | |
| 9,215,847 B2 | 12/2015 | Bainter | |
| 9,303,663 B2 | 4/2016 | Greenamyer et al. | |
| 9,416,513 B2 | 8/2016 | Kemp et al. | |
| 9,447,991 B2 | 9/2016 | Welle et al. | |
| 9,512,589 B1 | 12/2016 | Polen et al. | |
| 9,598,831 B2 | 3/2017 | Lutenegger et al. | |
| 9,631,335 B2 | 4/2017 | Reusing et al. | |
| 9,631,336 B2 | 4/2017 | Song | |
| 9,670,638 B2 | 6/2017 | Naggar et al. | |
| 9,689,134 B1 | 6/2017 | Li | |
| 9,689,136 B2 | 6/2017 | Dinh et al. | |
| 9,976,275 B2 | 5/2018 | Thurner et al. | |
| 10,006,185 B2 | 6/2018 | Tomchesson et al. | |
| 10,077,893 B1 | 9/2018 | Abraham | |
| 10,119,291 B2 | 11/2018 | McKinion | |
| 10,125,506 B2 | 11/2018 | Cusson et al. | |
| 10,221,538 B2 | 3/2019 | Lutenegger et al. | |
| 10,253,473 B2 | 4/2019 | Sun et al. | |
| 10,422,098 B2 | 9/2019 | West et al. | |
| 10,590,619 B2 | 3/2020 | Ronnkvist | |
| 10,615,739 B2 | 4/2020 | West et al. | |
| 10,670,303 B2 | 6/2020 | West et al. | |
| 10,697,490 B2 | 6/2020 | Hudson et al. | |
| 10,737,809 B2 | 8/2020 | Carreker | |
| 10,745,880 B2 | 8/2020 | West et al. | |
| 10,767,334 B2 | 9/2020 | Perko et al. | |
| 10,837,677 B2 | 11/2020 | Hudson et al. | |
| 10,903,784 B2 | 1/2021 | Hudson et al. | |
| 10,907,318 B2 | 2/2021 | Flanigan et al. | |
| D913,780 S | 3/2021 | Hudson et al. | |
| 10,934,677 B2 | 3/2021 | Mar et al. | |
| 11,015,635 B2 | 5/2021 | Almy et al. | |
| 11,121,671 B2 | 9/2021 | Hudson et al. | |
| 11,159,120 B2 * | 10/2021 | Kresse | F16H 57/038 |
| 11,264,942 B2 * | 3/2022 | Almy | H02S 30/10 |
| 11,480,643 B2 * | 10/2022 | Pesce | F24S 25/70 |
| 11,628,525 B2 * | 4/2023 | Hudson | H02S 20/10 405/232 |
| 2005/0100415 A1 | 5/2005 | Larovere | |
| 2006/0060749 A1 | 3/2006 | Dahlstrom | |
| 2007/0104555 A1 | 5/2007 | Sly | |
| 2007/0215199 A1 | 9/2007 | Dold et al. | |
| 2008/0029148 A1 | 2/2008 | Thompson | |
| 2010/0200192 A1 | 8/2010 | Consigny | |
| 2010/0266344 A1 | 10/2010 | Plotkin et al. | |
| 2011/0099923 A1 | 5/2011 | Ventura et al. | |
| 2011/0121144 A1 | 5/2011 | Berbegal Pastor | |
| 2011/0194901 A1 | 8/2011 | Jones | |
| 2011/0314749 A1 | 12/2011 | Rainer | |
| 2012/0308308 A1 | 12/2012 | Stewart | |
| 2013/0048582 A1 | 2/2013 | Kruse | |
| 2013/0326994 A1 | 12/2013 | Uetake et al. | |
| 2014/0186126 A1 | 7/2014 | Lin et al. | |
| 2014/0263927 A1 | 9/2014 | Scott et al. | |
| 2014/0374550 A1 * | 12/2014 | Straeter | F24S 25/70 248/156 |
| 2015/0000721 A1 | 1/2015 | Au | |
| 2015/0021530 A1 | 1/2015 | Gregory et al. | |
| 2015/0236637 A1 | 8/2015 | Sade | |
| 2015/0368870 A1 | 12/2015 | Utenegger et al. | |
| 2015/0368924 A1 | 12/2015 | Izradel | |
| 2017/0025989 A1 * | 1/2017 | Shaw | F24S 30/428 |
| 2017/0234580 A1 * | 8/2017 | Worden | F24S 30/42 126/606 |
| 2018/0051915 A1 | 2/2018 | Rainer | |
| 2018/0148901 A1 | 5/2018 | Kemp et al. | |
| 2019/0292742 A1 | 9/2019 | Plotkin et al. | |
| 2019/0372514 A1 | 12/2019 | Almy et al. | |
| 2020/0056343 A1 | 2/2020 | Wilson et al. | |
| 2020/0071901 A1 | 3/2020 | Charles et al. | |
| 2020/0072505 A1 | 3/2020 | Hudson et al. | |
| 2020/0076355 A1 | 3/2020 | Hudson et al. | |
| 2020/0115874 A1 | 4/2020 | Mar et al. | |
| 2020/0141074 A1 | 5/2020 | Martin et al. | |
| 2020/0149241 A1 | 5/2020 | Flanigan et al. | |
| 2020/0165789 A1 | 5/2020 | Stroyer | |
| 2020/0217034 A1 | 7/2020 | Karkheck et al. | |
| 2020/0248424 A1 | 8/2020 | Hudson et al. | |
| 2020/0256586 A1 | 8/2020 | West et al. | |
| 2020/0263723 A1 | 8/2020 | Hudson et al. | |
| 2020/0283980 A1 | 9/2020 | Plotkin et al. | |
| 2020/0284293 A1 | 9/2020 | Pesce et al. | |
| 2020/0308795 A1 | 10/2020 | Almy et al. | |
| 2020/0313602 A1 | 10/2020 | West et al. | |
| 2020/0392688 A1 | 12/2020 | Mar et al. | |
| 2021/0002896 A1 | 1/2021 | Almy | |
| 2021/0013828 A1 | 1/2021 | Hudson et al. | |
| 2021/0017729 A1 | 1/2021 | Karkheck et al. | |
| 2021/0018225 A1 | 1/2021 | Hudson et al. | |
| 2021/0075366 A1 | 3/2021 | West et al. | |
| 2021/0104904 A1 | 4/2021 | West | |
| 2021/0115642 A1 | 4/2021 | Almy et al. | |
| 2021/0124007 A1 | 4/2021 | Pesce et al. | |
| 2021/0138595 A1 | 5/2021 | Hudson et al. | |
| 2021/0140134 A1 | 5/2021 | Kraft et al. | |
| 2021/0172655 A1 | 6/2021 | Hudson et al. | |
| 2021/0175840 A1 | 6/2021 | Hudson et al. | |
| 2021/0257964 A1 * | 8/2021 | Hudson | H02S 20/10 |
| 2022/0052636 A1 * | 2/2022 | Au | H02S 20/32 |
| 2022/0128268 A1 * | 4/2022 | McPheeters | F24S 50/20 |
| 2023/0170841 A1 * | 6/2023 | Li | H02S 40/38 136/244 |

FOREIGN PATENT DOCUMENTS

| | | |
|---|---|---|
| WO | 2001023674 A1 | 4/2001 |
| WO | 2006126915 A2 | 11/2006 |
| WO | 2007036263 A1 | 4/2007 |
| WO | 2013067584 A1 | 5/2013 |
| WO | 2013178221 A1 | 12/2013 |
| WO | 2014067027 A1 | 5/2014 |
| WO | 2014106358 A1 | 7/2014 |
| WO | 2018111144 A1 | 6/2018 |
| WO | 2019195724 A1 | 10/2019 |

* cited by examiner

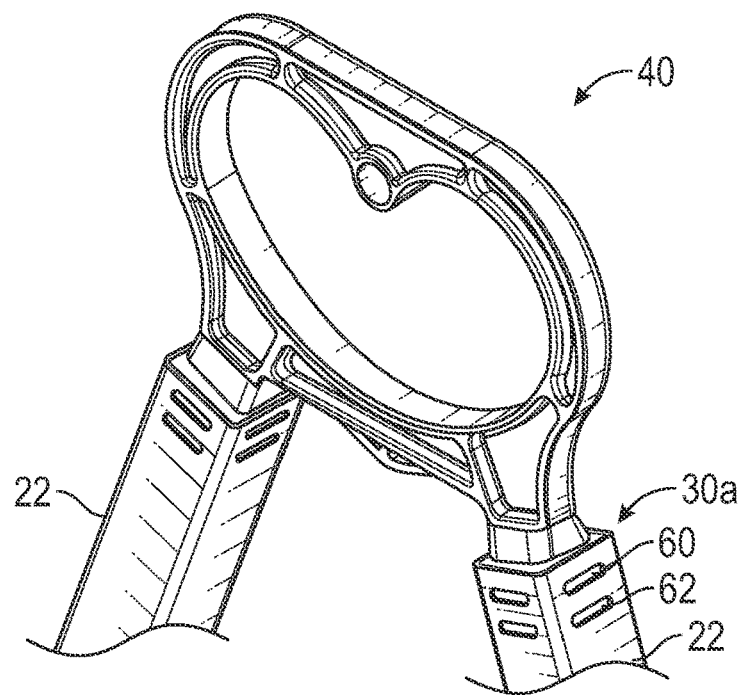
FIG. 6
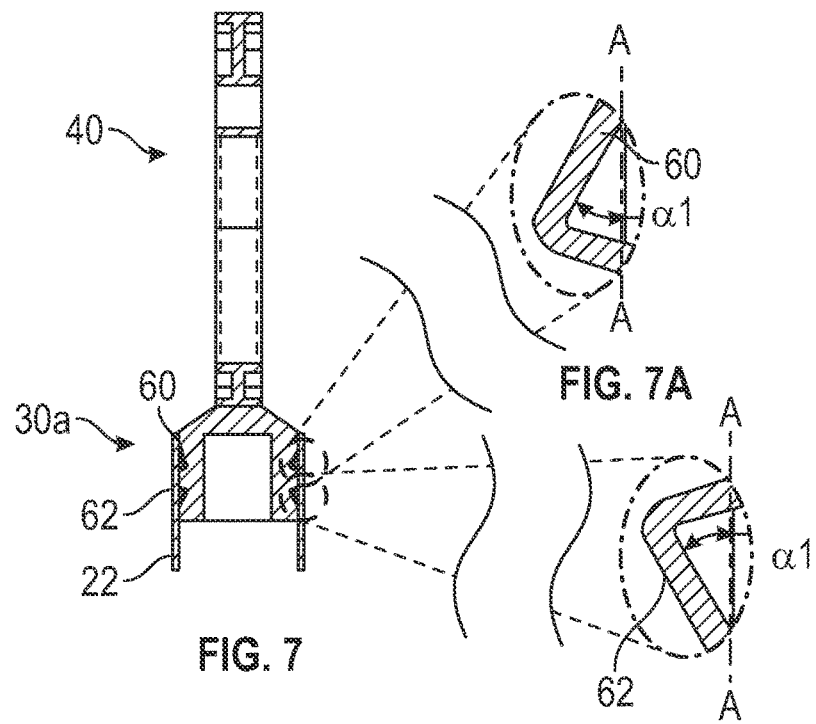
FIG. 7
FIG. 7A
FIG. 7B

SUPPORT FRAMES FOR SOLAR TRACKERS

CROSS-REFERENCE TO RELATED APPLICATION

The present disclosure claims the benefit of, and priority to, U.S. Provisional Patent Application Ser. No. 63/235,272, filed on Aug. 20, 2021, and U.S. Provisional Patent Application Ser. No. 63/078,228, filed on Sep. 14, 2020, the entire content of each of which is hereby incorporated by reference herein.

BACKGROUND

Technical Field

The present disclosure relates to solar power generation systems, and more particularly, to support structures for solar arrays within a solar tracking system.

Background of Related Art

One of the most significant, costly, and time-consuming aspects relating to the manufacture and installation of solar trackers is the use of piers to support the solar modules. These piers, typically C-channels, W-channels, I-beams, or the like, are driven deep into the ground using costly heavy machinery such as pile driving equipment or by casting the piers in-situ using costly micro-pile equipment. As can be appreciated, each process not only requires costly equipment, but also requires a significant amount of time to complete, driving up the cost of installing solar tracking systems. In view of these costly processes, solar tracker foundations that alleviate the need for costly and time-consuming processes involving heavy machinery are needed.

SUMMARY

In accordance with an aspect of the present disclosure, a pier for a solar tracking system includes a bearing housing assembly, a frame, the frame defining an A-profile having a pair of legs and a crown at a center portion thereof, and a mounting bracket, the mounting bracket coupled to a portion of the crown of the frame at a first portion thereof and coupled to a portion of the bearing housing assembly at a second portion thereof.

In aspects, the pier may include a fastener, the fastener coupling the bearing housing assembly to the mounting bracket.

In other aspects, the fastener may include an inclined washer, the inclined washing causing the fastener to engage the bearing housing assembly and the mounting bracket at an angle relative thereto.

In certain aspects, the fastener may include a pair of inclined washers, the pair of inclined washers causing the fastener to engage the bearing housing assembly and the mounting bracket at an angle relative thereto.

In other aspects, the bracket may define a U-shaped profile having a channel defined therethrough, wherein the crown of the frame is received within a portion of the channel.

In aspects, the pier may include a support bracket, the support bracket interposed between each of the pair of legs of the frame, a first end portion of the support bracket coupled to a portion of the first leg and a second, opposite end portion of the support bracket coupled to a portion of the second leg.

In accordance with another aspect of the present disclosure, a pier for a solar tracing system includes a plurality of legs, the plurality of legs coupled to one another to form a tripod type formation, wherein the plurality of legs includes a saddle interposed between one of the plurality of legs and the remaining plurality of legs, and a motor mount including first and second half sections, the first and second half sections configured to receive a portion of the saddle therebetween.

In aspects, each of the first and second half sections of the motor mount may define a hook shaped portion that is configured to receive a portion of the saddle therein.

In other aspects, the first and second half sections may cooperate to compress the saddle therebetween to inhibit movement of the motor mount relative to the saddle.

In certain aspects, a pair of the plurality of legs may define an A-shaped profile.

In other aspects, the saddle may be coupled to a crown of the A-shaped profile of the pair of legs.

In accordance with yet another embodiment of the present disclosure, a damper assembly for use with a solar tracker includes an upper damper mount operably coupled to a portion of a torque tube of the solar tracker, a lower damper mount operably coupled to a portion of a pier of the solar tracker, and a strut operably coupled to the upper damper mount at a first end portion thereof and operably coupled to the lower damper mount at a second, opposite end portion thereof, wherein rotation of the upper damper mount effectuates a compression or an extension of the strut between the upper damper mount and the lower damper mount.

In aspects, the lower damper mount may include first and second half sections, the first and second half sections hingedly coupled to one another to permit the first and second half sections to transition from a first, open position, to a second, closed position.

In other aspects, the lower damper mount may define an interior surface, the interior surface including a plurality of protuberances disposed thereon to abut a portion of the pier.

In certain aspects, the lower damper mount may include an upper plate, a lower plate, and a split collet interposed between the upper and lower plates.

In other aspects, the upper plate and the lower plate may each define a tapered surface thereon, the tapered surfaces of the upper and lower plates configured to abut a corresponding tapered surface of the split collet, wherein drawing the upper and lower plates towards one another causes the tapered surfaces of the upper and lower plates to abut the tapered surfaces of the split collet and effectuate a perpendicular translation of the split collet relative to the upper and lower plates.

In aspects, an interior surface of the split collet may define a plurality of ridges thereon.

In other aspects, an outer surface of the split collet may include a hoop disposed thereon, the hoop defining an elongated hole therethrough that is configured to receive a portion of a fastener therein.

In certain aspects, the upper plate may define a lower surface, the lower surface including a tab disposed thereon and extending therefrom, the tab including a post disposed thereon that is configured to be operably coupled to a portion of the strut.

In aspects, the tab may include a protuberance disposed on a lower surface thereof that is configured to be received within a corresponding bore defined in an upper surface of the lower plate to inhibit movement of the upper plate relative to the lower plate.

BRIEF DESCRIPTION OF THE DRAWINGS

Various aspects and features of the present disclosure are described hereinbelow with reference to the drawings, wherein:

FIG. 6 is a perspective view of the bearing housing assembly of FIG. 4 shown coupled to a pier of the solar tracker of FIG. 1;

FIG. 7 is a side, cross sectional view of the bearing housing assembly coupled to a pier of FIG. 6;

FIG. 7A is an enlarged view of the area of detail indicated in FIG. 7;

FIG. 7B is an enlarged view of the area of detail indicated in FIG. 7;

DETAILED DESCRIPTION

Figure 1:
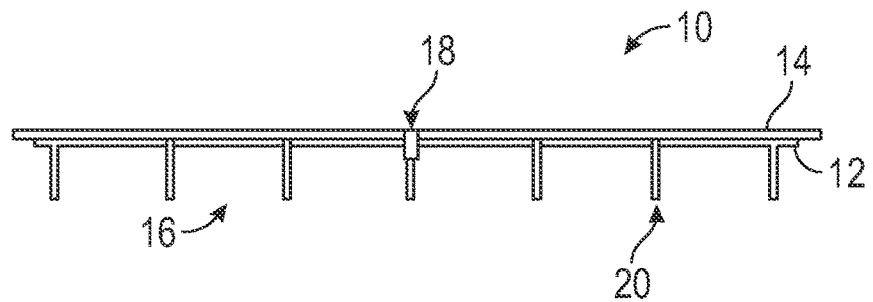
FIG. 1 is an elevation view of a solar tracker provided in accordance with the present disclosure.

The present disclosure is directed to solar tracking systems having piers defining a generally A-shaped profile. The pier may include a pair of piles either having a fixed length or an adjustable length. The piles can include a fin disposed thereon such that when the fin is driven into soil, the fin abuts an increased surface area of soil and increases the resistance of the pile from being rotated or twisted. The piles are coupled to a bearing housing assembly without utilizing fasteners. In this manner, the piles are crimped to a leg defines on the bearing housing assembly and having a plurality of annular ridges. The crimps define tabs that are received within grooves defined between each of the annular ridges to fixedly secure the bearing housing assembly to the pile. It is contemplated that the piles may have threads disposed thereon rather than fins if the soil conditions are more compacted.

In embodiments, the pier may include a frame having a generally A-frame profile. The frame is coupled to piles driven into the ground. The frame may include a third leg coupled to the A-frame profile via a saddle, to which a motor mount having a split configuration can be clamped to secure a slew drive to the frame. Alternatively, the frame may include a plurality of legs coupled to a center cylinder, a top plate or the like via fasteners, welding, adhesives, amongst others. It is envisioned that the frame may include a pair of A-frame portions coupled to a top plate such that the pair of A-frame portions are disposed in a perpendicular orientation to one another.

The solar tracking system may include a damper assembly having an upper damper mount coupled to a torque tube of the solar tracking system, a lower damper mount coupled to a leg of a frame of the pier, and a strut coupled to the upper damper mount at a first end portion thereof and coupled to the lower damper mount at a second, opposite end portion thereof. In embodiments, the damper assembly may include a pair of struts and a corresponding pair of lower damper mounts. In this manner, the upper damper mount may define a generally boomerang type configuration defining a pair of wings.

The lower damper mount may include a pair of half sections hingedly coupled to one another to permit the pair of half sections to transition from a first, open configuration to a second, closed configuration. The lower damper mount may include a plurality of protuberances disposed on an inner surface thereof to aid in inhibiting movement of the lower damper mount relative to the leg of the frame when the pair of half sections is in the second, closed configuration. It is contemplated that the lower damper mount may include a bolt inserted through both the half sections, and thereby a portion of the leg contained therein, or the inner surface may include one or more dimples rather than a plurality of protuberances.

In embodiments, the lower damper mount may include an upper plate, a lower plate, and a slit collet interposed therebetween. The upper and lower plates define a respective tapered surface at a center portion thereof that is configured to abut a corresponding tapered portion defined on an upper and lower portion of the split collet, such that as the upper and lower plates are drawn towards one another, the split collet is caused to translate in a perpendicular direction relative to the upper and lower mounts and clamp a portion of the fame that is disposed therein.

Referring now to the drawings, a solar tracker provided in accordance with the present disclosure is illustrated in FIG. 1 and generally identified by reference numeral 10. The solar tracker 10 includes a plurality of piers 20 disposed in spaced relation to one another and embedded in the earth. A torque tube 12 extends between each adjacent pier 20 and is rotatably supported on each pier 20. The solar tracker 10 includes a plurality of solar panels 14 supported on each respective torque tube 12. The span between two adjacent piers 20 is referred to as a bay 16 and may be generally in the range of about 8 meters in length. A plurality of solar trackers 10 may be arranged in a north-south longitudinal orientation to form a solar array.

The solar tracker 10 includes at least one slew drive 18 operably coupled to the torque tube 12 and supported on a respective pier of the plurality of piers 20. The slew drive 18 effectuates rotation of the torque tube 12, which effectuates a corresponding rotation of the solar panels 14 to track the location of the sun. The solar tracker 10 includes a plurality of bearing housing assemblies (BHA) 40 disposed on respective piers of the plurality of piers 20. Each of the plurality of bearing housing assemblies 40 is operably coupled to the torque tube 12 to rotatably support the torque tube 12 therein as the torque tube 12 is caused to be rotated by the slew drive 18, as will be described in further detail hereinbelow.

Figure 2:
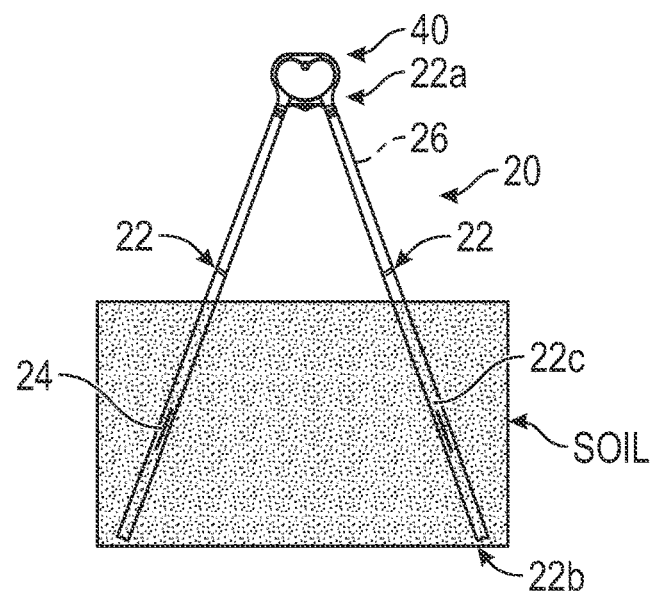
FIG. 2 is an elevation view of a pier of the solar tracker of FIG. 1.
Figure 3:
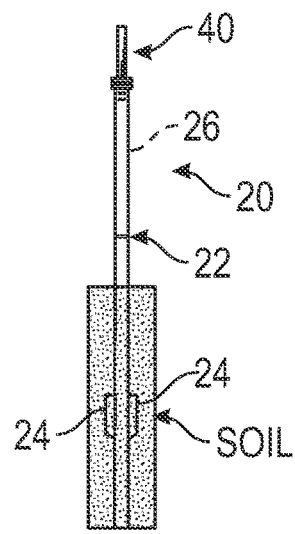
FIG. 3 is a side, elevation view of the pier of FIG. 2.
Figure 3A:
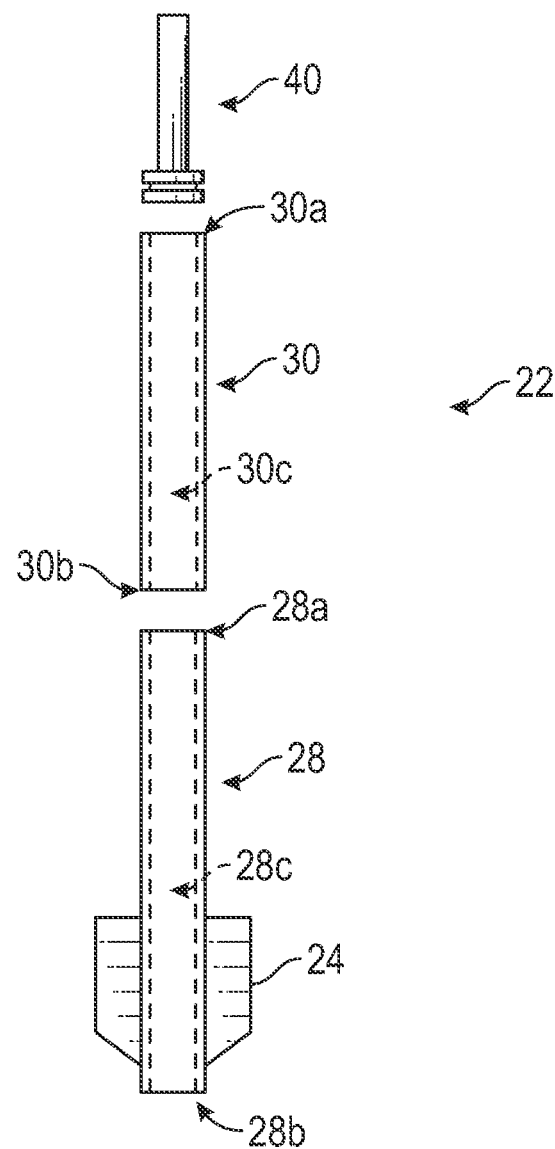
FIG. 3A is an elevation view of an alternate embodiment of the pier of FIG. 2.

With reference to FIGS. 2 and 3, a pier of the plurality of piers 20 is illustrated. In the interest of brevity, only one pier of the plurality of piers 20 will be described herein. The pier 20 includes a pair of piles 22. Each pile of the pair of piles 22 is substantially similar and therefore, only one pile of the pair of piles 22 will be described in detail herein in the interest of brevity. The pile 22 includes an elongate body extending between opposed first and second end portions 22a and 22b, respectively. The elongate body defines a generally square profile, although it is contemplated that the elongate body may define any suitable profile, such as circular, rectangular, hexagonal, amongst others. An outer surface 22c of the elongate body includes fin 24 disposed thereon and extending longitudinally therealong. The fin 24 defines a generally planar profile having a generally rectangular shape and having a cross-section (e.g., thickness) that is thinner than that of the elongate body of the pile 22. In this manner, the fin 24 easily passes through soil as the pile is driven into the ground (e.g., along a longitudinal axis). The rectangular shape of the fin 24 defines a surface area that abuts a corresponding surface area of soil. In this manner, as the pile is causes to be rotated, either about its longitudinal axis or transverse to its longitudinal axis, the surface area of the fin 24 abuts or otherwise pushes against the soil to inhibit rotation of the pile 22. It is contemplated that the pile 22 may include any suitable number of fins 24, such as one, two, three, four, amongst others and the fins 24 may be disposed at any location along the length of the pile 22. As can be appreciated, the greater the number of fins 24, and likewise, the greater the surface area of the fin or fins 24 the greater the resistance to rotation of the pile 22. It is envisioned that the fin 24 may be coupled to the outer surface 22c of the elongate body of the pile 22 using any suitable means, such as fasteners, welding, press-fit, adhesives, amongst others.

It is envisioned that the pile 22 includes a tubular configuration having a hollow interior portion 26 defined therein and through each of the opposed first and second end portions 22a, 22b, respectively. The hollow interior portion 26 is configured to receive a portion of the bearing housing assembly 40 therein such that the portion of the bearing housing assembly 40 received within the hollow interior portion 26 may be fixedly retained therein, as will be described in further detail hereinbelow.

Although generally described as being a unitary piece, it is contemplated that the pile 22 may be formed from two or more pieces. In this manner, the pile 22 may be formed from a lower portion 28 and an upper portion 30. The lower portion 28 includes an elongate body extending between opposed first and second end portions 28a and 28b, respectively. The elongate body includes a hollow interior portion 28c defined therein and extending through each of the first and second end portions 28a, 28b, respectively, although in embodiments it is envisioned that the hollow interior portion 28c may extend only a portion of the way into elongate body. The lower portion 28 is configured to be driven into the ground and may include the fin 24 disposed thereon.

The upper portion 30 includes an elongate body extending between opposed first and second end portions 30a and 30b, respectively. The elongate body includes a hollow interior portion 30c defined therein and extending through each of the first and second end portions 30a, 30b, respectively, although in embodiments it is envisioned that the hollow interior portion 30c may extend only a portion of the way into elongate body.

The hollow interior portion 28c of the lower portion 28 is configured to receive a portion of the upper portion 30 therein. The portion of the upper portion 30 received within the hollow interior portion 28c of the lower portion 28 is fixedly secured to the lower portion 28 by crimping or otherwise compressing a portion of the elongate body of the lower portion 28 adjacent the first end portion 30a. In this manner, the upper and lower portions 28, 30 of the pile are coupled to one another without using fasteners, although it is contemplated that fasteners may be utilized in addition to or in lieu of crimping. As can be appreciated, in embodiments, the lower portion 28 may receive a portion of the upper portion 30 therein.

Figure 4:
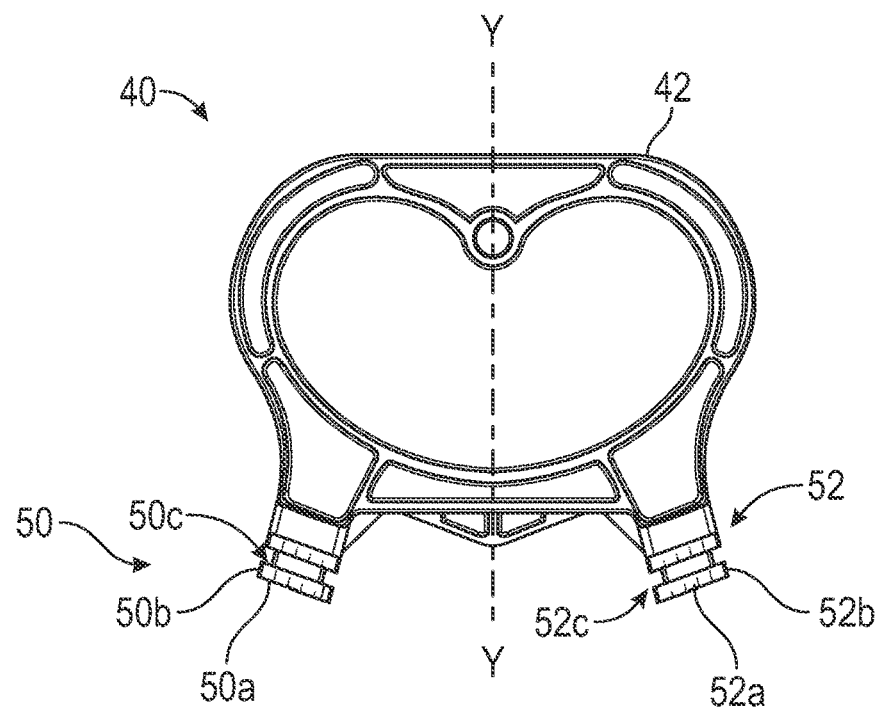
FIG. 4 is an elevation view of a bearing housing assembly of the solar tracker of FIG. 1.
Figure 5:
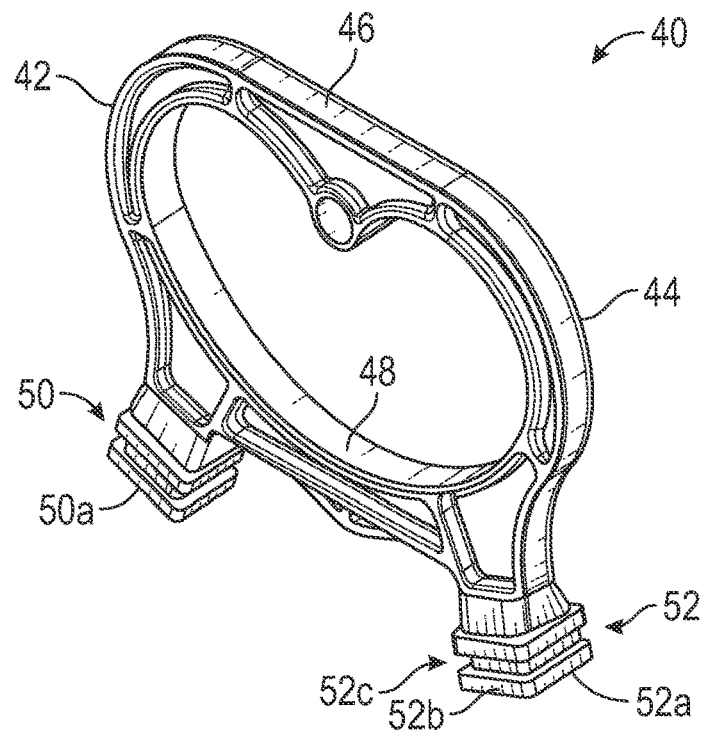
FIG. 5 is a perspective view of the bearing housing assembly of FIG. 4.

With reference to FIGS. 4-6, a bearing housing assembly of the plurality of bearing housing assemblies 40 is illustrated. Each of the plurality of bearing housing assemblies 40 is substantially similar and therefore, only one bearing housing assembly 40 will be described in detail herein in the interest of brevity.

The bearing housing assembly 40 defines a generally oval shaped outer profile including opposed first and second side surfaces 42 and 44, respectively and an outer surface 46 extending between each of the first and second side surfaces 42, 44. An inner surface 48 defines a cavity extending through each of the first and second side surface 42, 44 and is configured to receive a portion of a torque tube 12 therethrough. The outer surface 46 includes a pair of legs 50 and 52 disposed thereon and extending therefrom at a lower portion of the bearing housing assembly 40 and terminating at end portions 50a and 52a, respectively. Each of the pair of legs 50, 52 is disposed adjacent a side portion of the bearing housing assembly 40 and is disposed at an angle or otherwise splayed outward relative to a vertical axis "Y-Y" defined through a central portion of the bearing housing assembly 40, although it is contemplated that the pair of legs 50, 52 may be disposed at any angle relative to the vertical axis "Y-Y" and may be disposed angles relative to one another. Although generally illustrated as having a square profile, it is contemplated that the pair of legs 50, 52 may include any suitable profile, such as circular, oval, octagonal, amongst other and each of the pair of legs 50, 52 may include the same or different profile.

The outer surface 46 of each of the pair of legs 50, 52 defines a respective pair of annular ridges 50b and 52b, respectively, that cooperate to define respective annular grooves 50c and 52c therebetween. The pair of annular ridges 50b, 52b includes an outer dimension that is configured to be received within the hollow interior portion 30c of the upper portion 30 of the pile 22 adjacent the first end portion 30a thereof. It is envisioned that the pair of annular ridges 50b, 52b may be slidably received within the hollow interior portion 30c, may be a friction fit, amongst others.

With continued reference to FIG. 6 and with additional reference to FIG. 7, the bearing housing assembly 40 is retained on each of the piers 22 by means of crimping or other similar means. In one non-limiting embodiment, the crimping forms a pair of triangular shaped protuberances or fins 60 and 62 disposed in juxtaposed relation to one another. In this manner, an upper fin 60 defines a generally triangle shaped profile forming a generally horizontal profile facing away from first end portion 30a whereas a lower fin 62 defines a generally triangle shaped profile forming a generally horizontal profile facing towards the first end portion 30a. In this manner, the upper fin 60 is received within the annular grooves 50c, 52c and inhibits movement of the bearing housing assembly 40 away from the first end portion 30a and the lower fin 62 is disposed adjacent the end portions 50a, 52a and inhibits movement of the bearing housing assembly 40 towards the first end portion 30a, thereby inhibiting overall movement of the bearing housing assembly 40 relative to the piles 22. In embodiments, it is contemplated that the fins 60, 62 include a hypotenuse forming an angle $\alpha_1$ of 30 degrees relative to a central axis "A-A" formed through the upper portion 30 of the pier 22, although it is contemplated that the hypotenuse of each of the fins 60, 62 may include any suitable angle and may be the same or different for each of the fins 60, 62.

Figure 8:
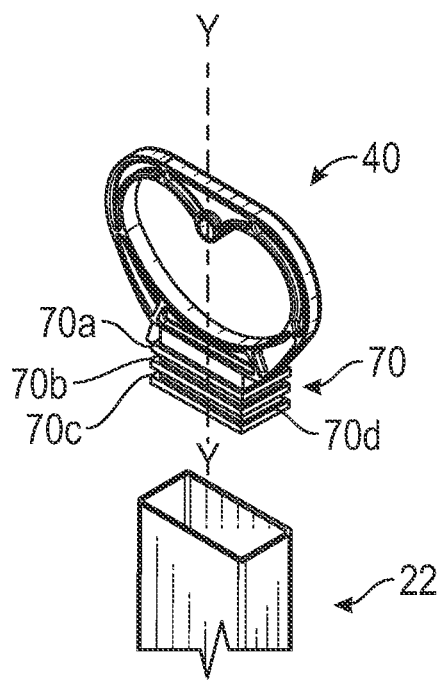
FIG. 8 is a perspective view of an alternate embodiment of the bearing housing assembly of FIG. 4.

With reference to FIG. 8, it is envisioned that the bearing housing assembly 40 may include a single leg 70 disposed on a lower portion of the outer surface 46 and generally aligned with the vertical axis "Y-Y." Although generally illustrated as having three annular ridges 70a, 70b, and 70c, it is contemplated that the leg 70 may include any suitable number of annular ridges, such as one, two, four, amongst others. As can be appreciated, the number of annular grooves 70d formed between each of the annular ridges 70a, 70b, 70c, etc. will coincide with the number of annular ridges, and likewise, the number of crimps will likewise vary.

Figure 9:
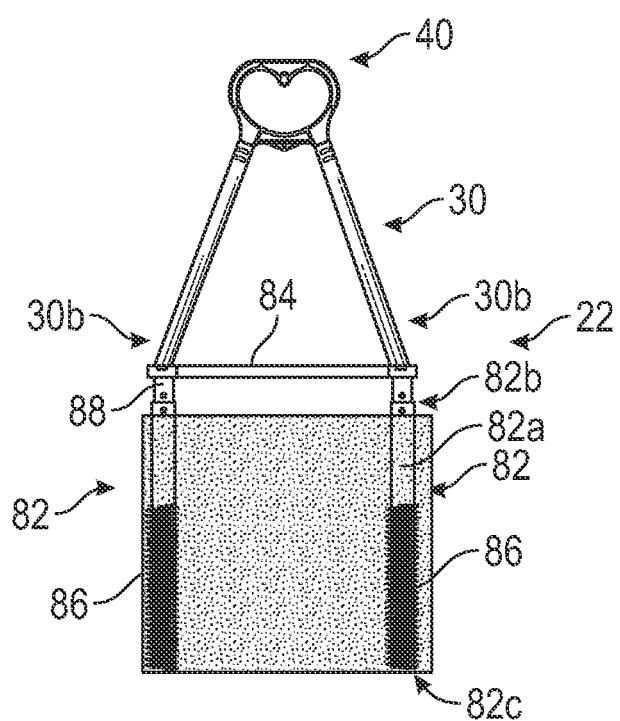
FIG. 9 is a front, elevation view of an alternate embodiment of a pier of the solar tracker of FIG. 1.
Figure 10:
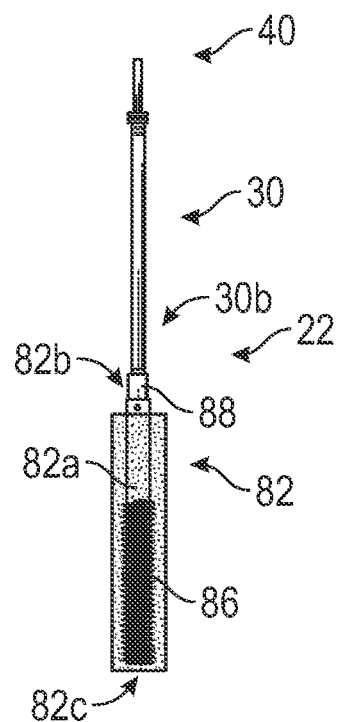
FIG. 10 is a side, elevation view of the pier of FIG. 9.

With reference to FIGS. 9 and 10, it is envisioned that the upper portion 30 of the piers 22 may be coupled a frame 80 having a pair of screw piles 82 and a cross member 84. Each of the screw piles 82 is substantially similar and therefore only one screw pile 82 will be described in detail herein in the interest of brevity. The screw pile 82 includes an elongate body having an outer surface 82a extending between opposed first and second end portions 82b and 82c, respectively. The elongate body includes a hollow interior portion (not shown) extending through each of the first and second end portions 82b, 82c, although in embodiments, it is contemplated that the hollow interior portion may not extend through the second end portion, thereby inhibiting the ingress of soil or other contaminants as the screw pile 82 is driven into the soil. The outer surface 82a of the screw pile 82 includes a plurality of threads 86 disposed thereon extending from adjacent the second end portion 82c and towards the first end portion 82b. As can be appreciated, the plurality of threads 86 engage the soil as the screw pile 82 is rotated. In this manner, as the screw pile 82 is rotated in a first direction, the plurality of threads 86 engage the soil and cause the screw pile 82 to be driven or otherwise embedded within the soil. Rotation of the screw pile 82 in a second, opposite direction, causes the screw pile to be removed or otherwise removed from the soil. It is envisioned that the plurality of threads 86 may be coupled to the outer surface 82a of the screw pile 82 using any suitable means, such as welding, adhesives, mechanical means (roll forming, etc.), amongst others.

The screw pile 82 includes a telescoping member 88 that is slidably received within the hollow interior portion (not shown) of the screw pile 82, such that the telescoping member 88 may slide into and out of the hollow interior portion of the screw pile to adjust the overall length of the screw pile 82. In this manner, if a lower height above grade (e.g., above the soil) is desired, the telescoping member 88 may be slid further into the screw pile 82. Conversely, if a greater height above grade is desired, the telescoping member 88 may be slid out of the screw pile 82 to reveal more of the telescoping member 88 and thereby increase the overall length of the screw pile 82. Once a desired overall length of the screw pile 82 is achieved, the telescoping member 88 may be coupled to the screw pile 82 using any suitable means, such as crimping, fasteners, rivets, welding, adhesive, etc.

The cross member 84 extends between each of the pair of screw piles 82 and is coupled thereto using any suitable means, such as fasteners, rivets, welding, adhesives, amongst others. The cross member 84 provides a platform to which the second end portion 30b of each of the upper portions 30 of the piers 22 may be coupled to rigidly support the bearing housing assembly 40, and thereby the solar panels 14. It is envisioned that the second end portion 30b of the upper portions 30 may be coupled to the cross member 84 using any suitable means, such as fasteners, welding, adhesives, amongst others.

Figure 11:
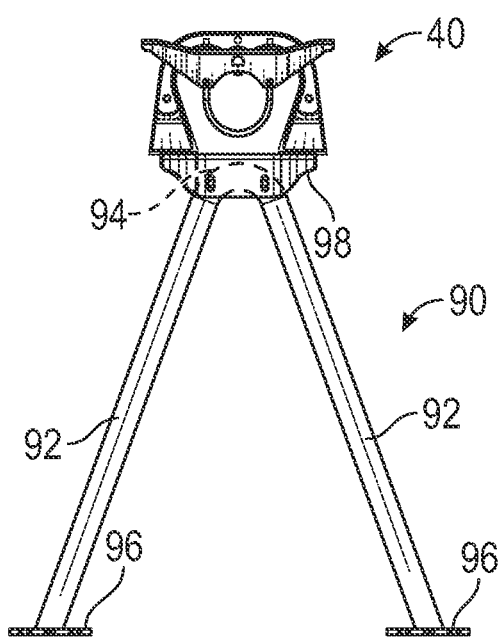
FIG. 11 is a front, elevation view of yet another embodiment of a pier of the solar tracker of FIG. 1.
Figure 12:
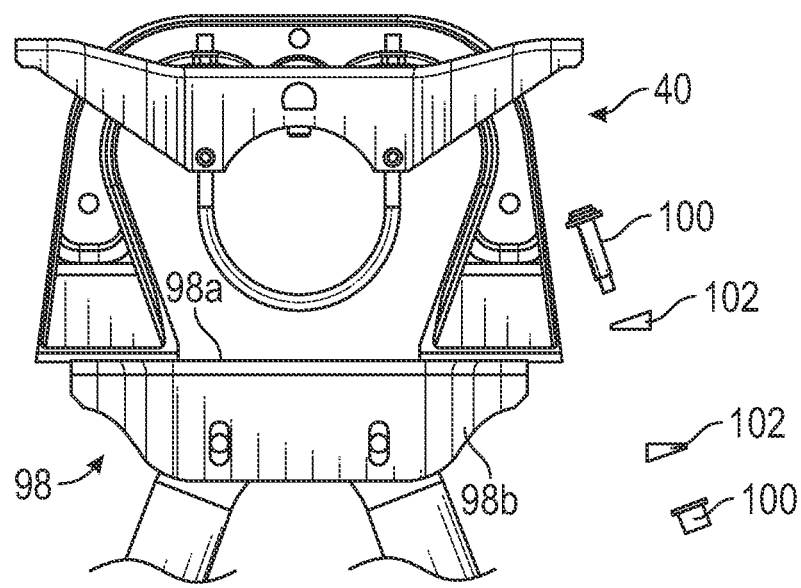
FIG. 12 is an elevation view of the pier of FIG. 11 showing fasteners for coupling a bearing housing assembly of the solar tracker of FIG. 1 to the pier of FIG. 11.
Figure 13:
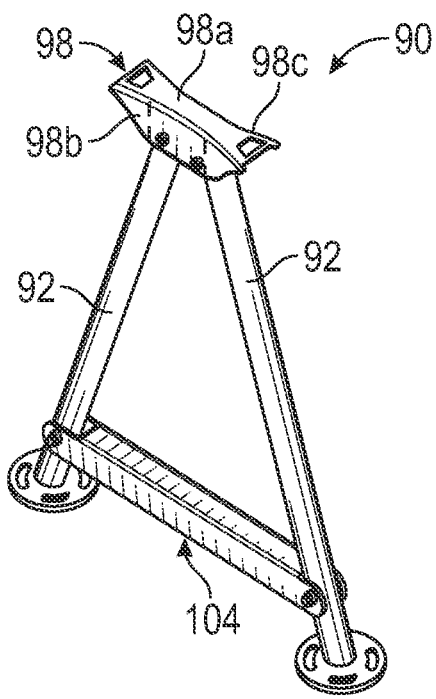
FIG. 13 is a perspective view of another embodiment of the pier of FIG. 11.
Figure 14:
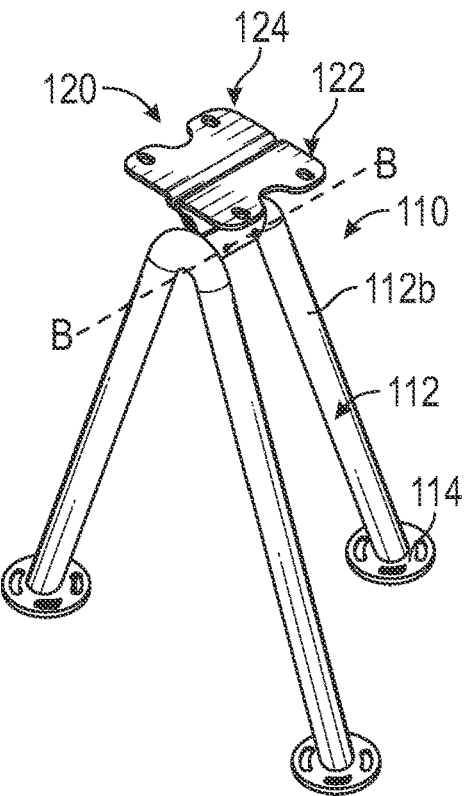
FIG. 14 is a perspective view of still another embodiment of a pier of the solar tracker of FIG. 1.
Figure 15:
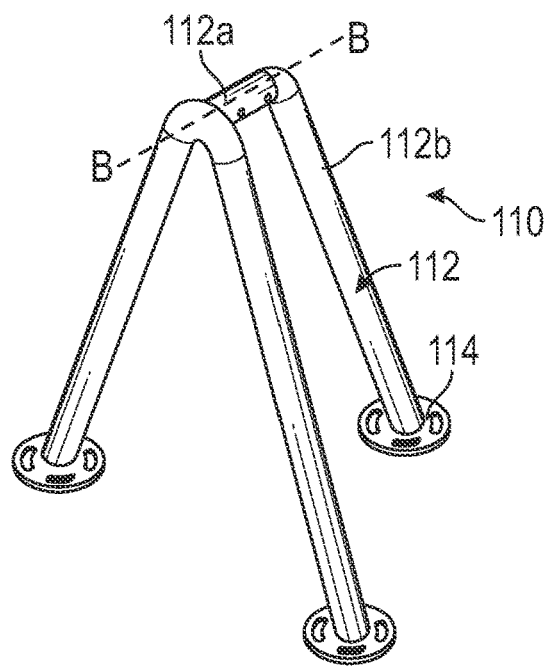
FIG. 15 is a perspective view of the pier of FIG. 14 showing a frame thereof.
Figure 16:
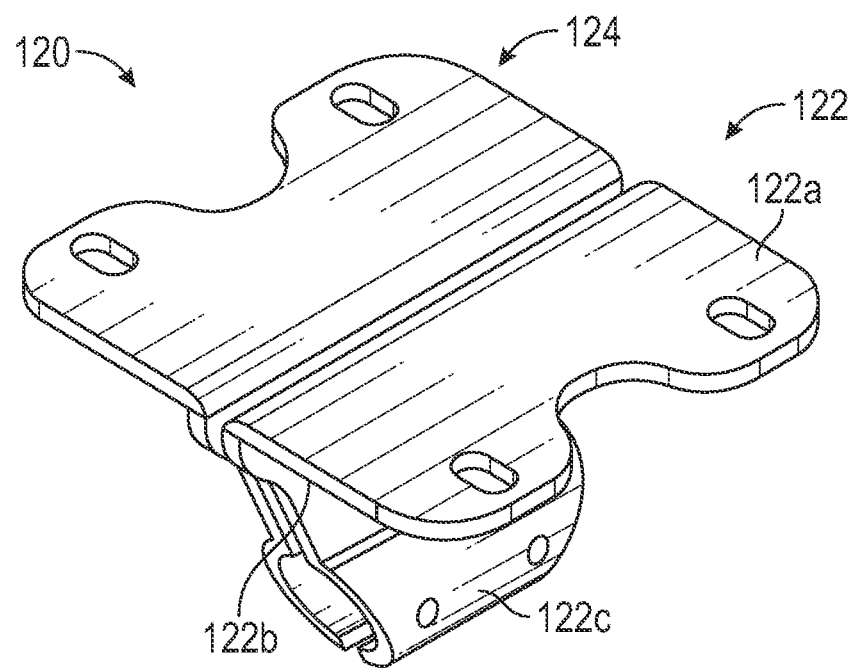
FIG. 16 is a perspective view of a motor mount of the pier of FIG. 14.
Figure 17:
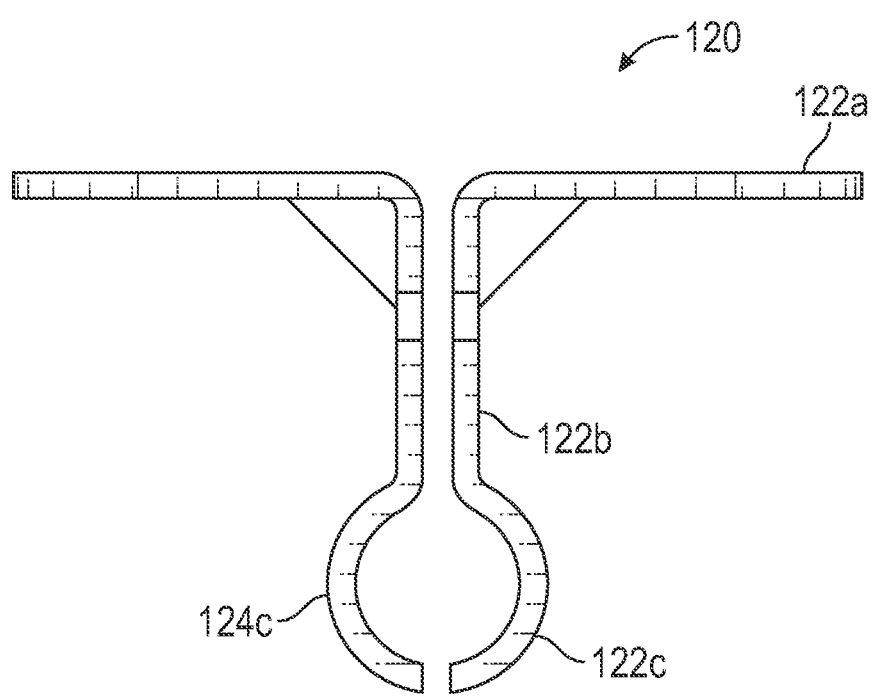
FIG. 17 is a side, elevation view of the motor mount of FIG. 16.

Turning to FIGS. 11-13, another embodiment of a pier is illustrated and generally identified by reference numeral 90. The pier 90 is formed from a tube forming a generally "A" profile. In this manner, the pier 90 defines a pair of legs 92 and a crown 94 at a center portion thereof. Each of the pair of legs 92 terminates at a mounting plate 96 that is coupled thereto using any suitable means, such as fasteners, welding, adhesives, amongst others. The pier 90 is formed from a unitary piece (e.g., a length of tube or pipe) that has been bent or otherwise formed into the generally "A" profile. In embodiments, the pier 90 may be formed from multiple pieces that have been coupled to one another by means of welding, adhesives, fasteners, amongst others.

Figure 11C:
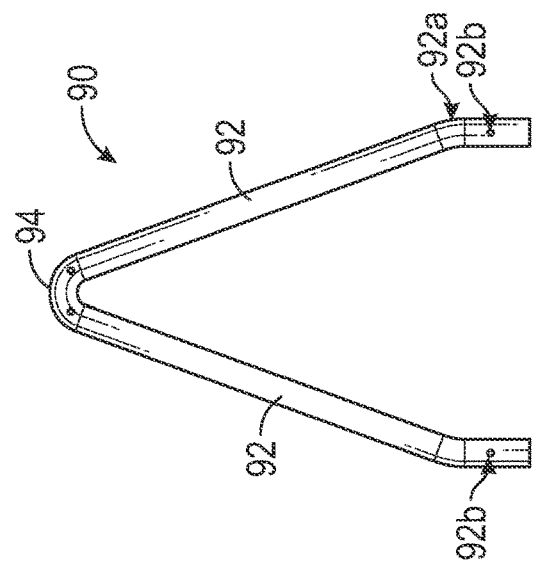
FIG. 11C is a front, elevation view of another embodiment of the pier of FIG. 11A.
Figure 11B:
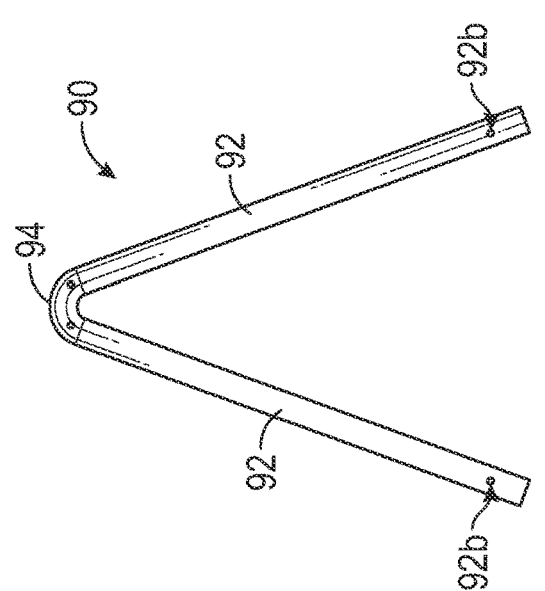
FIG. 11B is a front, elevation view of yet another embodiment of the pier of FIG. 11.
Figure 11A:
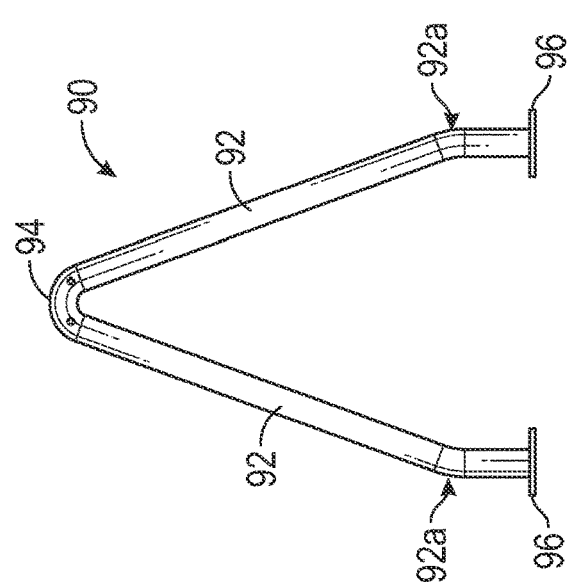
FIG. 11A is a front, elevation view of another embodiment of the pier of FIG. 11.

Although generally illustrated as being linear, it is contemplated that the pair of legs 92 may include a bend 92a (FIG. 11A) formed thereon adjacent the mounting plate 96 such that the pair of legs 92 intersect the mounting plate 96 at a generally perpendicular angle thereto. In embodiments, the pier 90 may not include a mounting plate 96, and rather, each leg of the pair of legs 92 may include mounting holes 92b (FIGS. 11B and 11C) formed therethrough adjacent an end portion located opposite to the crown 94.

Figure 11F:
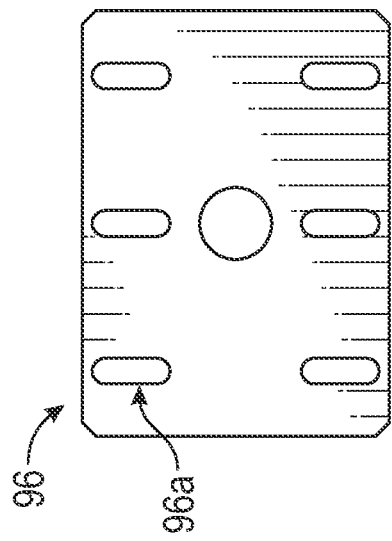
FIG. 11F is a plan view of yet another embodiment of a mounting plate of the pier of FIG. 11.
Figure 11I:
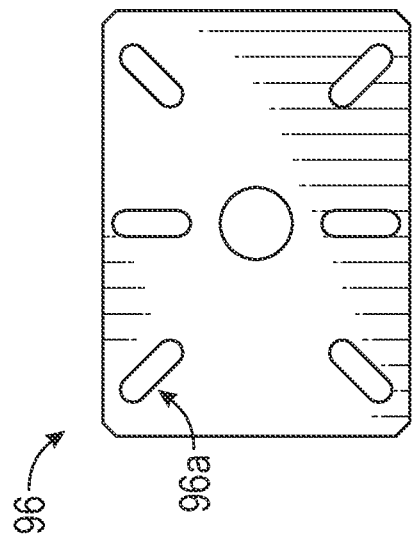
FIG. 11I is a plan view of yet another embodiment of a mounting plate of the pier of FIG. 11.
Figure 11E:
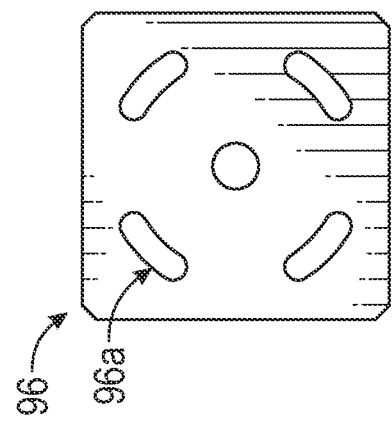
FIG. 11E is a plan view of another embodiment of a mounting plate of the pier of FIG. 11.
Figure 11H:
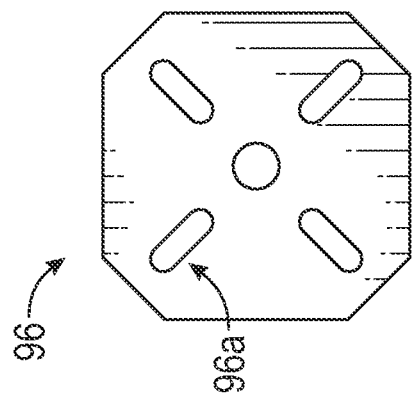
FIG. 11H is a plan view of another embodiment of a mounting plate of the pier of FIG. 11.
Figure 11D:
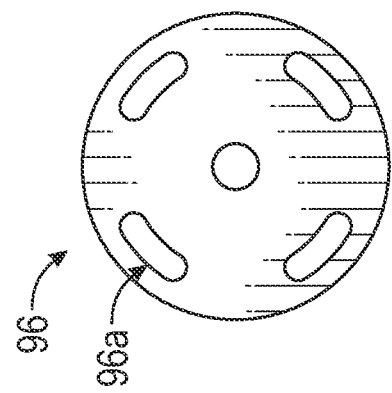
FIG. 11D is a plan view of a mounting plate of the pier of FIG. 11.
Figure 11G:
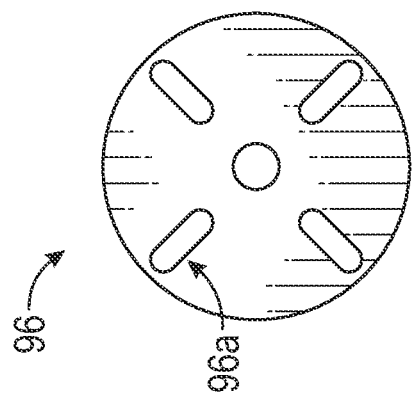
FIG. 11G is a plan view of still another embodiment of a mounting plate of the pier of FIG. 11.

It is envisioned that the mounting plate 96 may include any suitable profile, and in embodiments may include a circular profile with mounting holes 96a having an arcuate profile (FIG. 11D), a square profile with mounting holes 96a having an arcuate profile (FIG. 11E), a rectangular profile with mounting holes 96a having a linear profile and disposed in a vertical orientation (e.g., aligned in the same direction) (FIG. 11F), a circular profile with mounting holes 96a having a linear profile (FIG. 11G), an octagonal profile with mounting holes 96a having a linear profile (FIG. 11H), or a rectangular profile with mounting holes 96a having a linear profile and oriented in a cross configuration (e.g., the mounting holes 96a located adjacent the sides thereof angled towards an interior portion of the mounting plate 96) (FIG. 11I). Although generally described as including the above-mentioned shapes, it is envisioned that the mounting plate 96 may include any suitable profile and have mounting holes 96a having any suitable profile and disposed in any suitable arrangement thereon.

Although generally illustrated as having a circular profile, it is contemplated that the pier 90 may include any suitable profile, such as square, oval, rectangular, octagonal, amongst others. The pier 90 includes a support bracket 98 defining a generally U-shaped or saddle profile defining an upper surface 98a and a pair of legs 98b and 98c, respectively, defining a respective channel (not shown) therebetween that is configured to receive a portion of the crown 94 therein. The support bracket 98 is coupled to the crown 94 using any suitable means, such as fasteners, welding, adhesives, amongst others.

The bearing housing assembly 40 is coupled to the support bracket 98 using a fastener 100 (e.g., nut and bolt) and a pair of inclined washers 102 that enable the fastener 100 to be secured to the bearing housing assembly 40 and the support bracket 98 at an angle relative thereto to clear or otherwise avoid interference with the pier 90. In one non-limiting embodiment, the fastener is a bobtail pin and a corresponding bobtail collar, although it is contemplated that any suitable fastener may be utilized.

With continued reference to FIGS. 11-13, it is envisioned that the pier 90 may include a cross-member 104 extending between each of the pair of legs 92 and coupled thereto using any suitable means, such as fasteners, welding, adhesives, amongst others. As can be appreciated, the cross-member 104 inhibits splaying or spreading apart of the pair of legs 92 as a load is placed on the crown 94.

With reference to FIGS. 14-17, another embodiment of a pier is illustrated and generally identified by reference numeral 110. The pier 110 is substantially similar to the pier 90, and therefore only the differences therebetween will be described in detail herein in the interest of brevity. The pier 110 includes a third leg 112 having a saddle 112a disposed in a generally horizontal configuration and an elongate member 112b extending therefrom at an obtuse angle relative to an axis "B-B" defined through a center portion of the saddle 112a. In this manner, the third leg 112 causes the pier 110 to have a tripod or three-legged stool configuration. The elongate member 112b includes a flange or mounting bracket 114 disposed at an end portion thereof that is opposite the saddle 112a to enable the third leg to be secured to a portion of a pier driven into the soil.

The pier 110 includes a motor bracket 120 that is configured to be selectively coupled to the saddle 112a at a first portion thereof and selectively coupled to a slew drive (not shown) or other motor utilized in the solar tracker 10 to effectuate movement of the torque tube 12 and thereby, the solar panels 14. The motor bracket 120 includes first half portion 122 and a second half portion 124 disposed in juxtaposed relation thereto. Each of the first and second half portions 122, 124 is substantially similar and therefore only the first half portion 122 will be described in detail herein in the interest of brevity.

The first half portion 122 includes an upper plate 122a and a lower plate 122b disposed thereon and forming a generally right angle with respect thereto. In this manner, the upper plate 122a and lower plate 122b define a generally L-shaped profile. The lower plate 122b extends away from the upper plate 122a and includes a hook shaped portion 122c disposed at an end portion 122d thereof. The hook shaped portion 122c defines an arcuate profile that is configured to receive a portion of the saddle 112a therein. It is contemplated that the hook shaped portion 122c may include any suitable profile, such as circular, oval, hexagonal, amongst others, and may be the same or different from the profile of the saddle 112a.

As can be appreciated, the first and second half portions 122 and 124 cooperate to clamp onto or otherwise compress on the saddle 112a within the respective hook shaped portions 122c, 124c. It is envisioned that the first and second half portions 122 and 124 may be secured to the saddle 112a using any suitable means, such as fasteners, welding, adhesives, amongst others. In this manner, the orientation of the motor bracket 120 relative to the saddle 112a may be set before clamping or otherwise fixing the motor bracket 120 to the saddle 112a.

Figure 18:
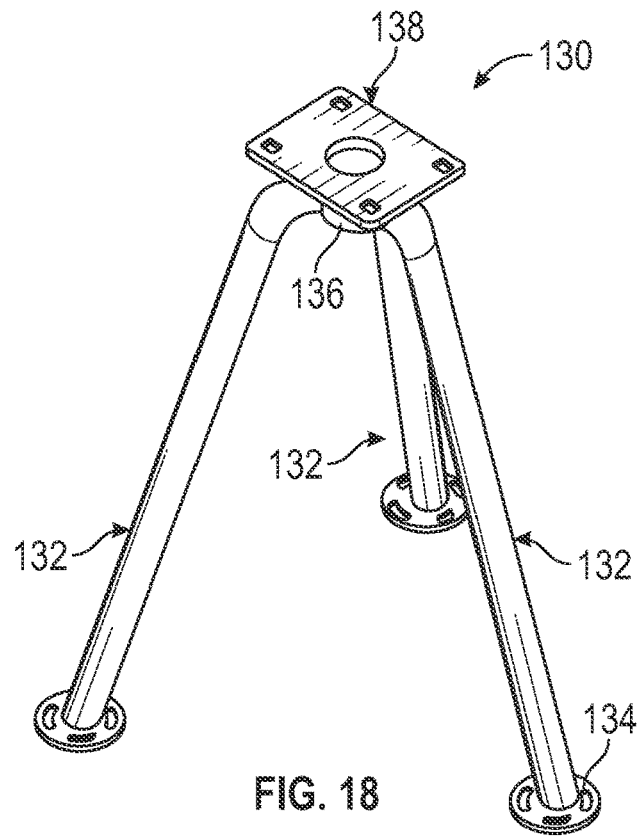
FIG. 18 is a perspective view of another embodiment of a pier of the solar tracker of FIG. 1.
Figure 19:
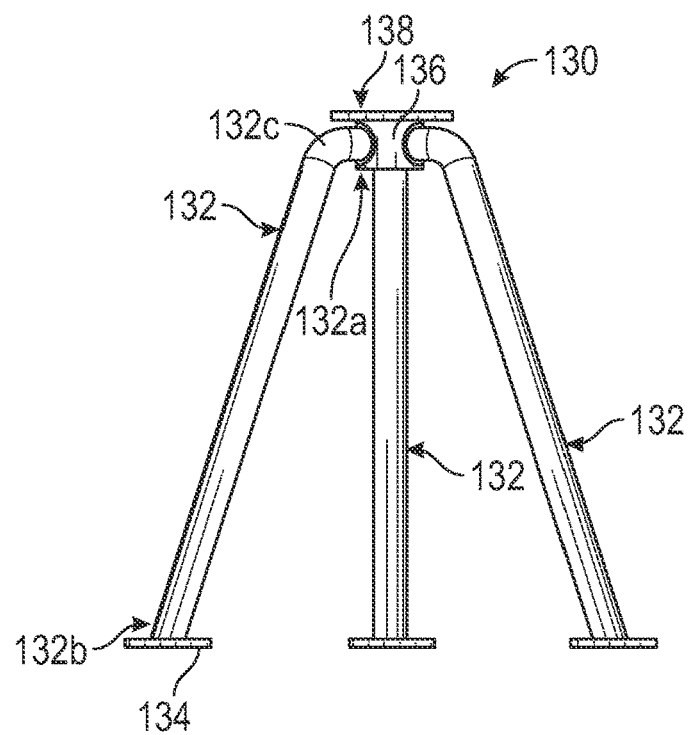
FIG. 19 is an elevation view of the pier of FIG. 18.

Turning to FIGS. 18 and 19, another embodiment of a pier is illustrated and generally identified by reference numeral 130. The pier 130 includes a plurality of legs 132, a barrel 136, and a motor plate 138. The plurality of legs 132 each include an elongate body extending between opposed first and second end portions 132a and 132b, respectively. The second end portion 132b is coupled to a flange 134 using any suitable means, such as fasteners, welding, adhesives, amongst others. The elongate body includes a bend adjacent the first end portion 132a to define a generally horizontal leg 132c. It is contemplated that the plurality of legs 132 may be formed from a unitary body or may be formed from a plurality of elements that are joined to one another using any suitable means, such as fasteners, welding, adhesives, or the like. In one non-limiting embodiment, the plurality of legs 132 is formed from a unitary component that is bent or otherwise formed into a generally L-shaped profile.

The horizontal leg 132c of each of the plurality of legs 132 is coupled to a portion of the barrel 136 such that the barrel 136 forms a generally perpendicular angle with respect to the horizontal leg 132c (e.g., the barrel 136 is maintained in a generally vertical position). Each of the plurality of legs 132 is coupled to the barrel 136 in a spaced apart fashion (e.g., radially spaced apart at an angle relative to one another), and in one non-limiting embodiment, three legs 132 are coupled to the barrel 136 at an angle of 120 degrees relative to one another to form a generally tripod type configuration, although it is contemplated that any suitable angle may be formed between the plurality of legs 132 and the angle formed between adjacent legs 132 may be the same or different than angles formed between other adjacent legs 132. As can be appreciated, any number of legs 132 may be utilized, such as four, five, six, etc.

The motor plate 138 defines a generally planar surface and is coupled to an upper portion of the barrel 136 such that the motor plate 138 defines a generally perpendicular angle relative thereto. It is contemplated that the motor plate 138 may be coupled to the barrel 136 using any suitable means, such as fasteners, welding, adhesives, amongst others. The motor plate 138 is configured to be selectively coupled to a slew drive (not shown) or other motor utilized in the solar tracker 10 to effectuate movement of the torque tube 12 and thereby, the solar panels 14.

Figure 20:
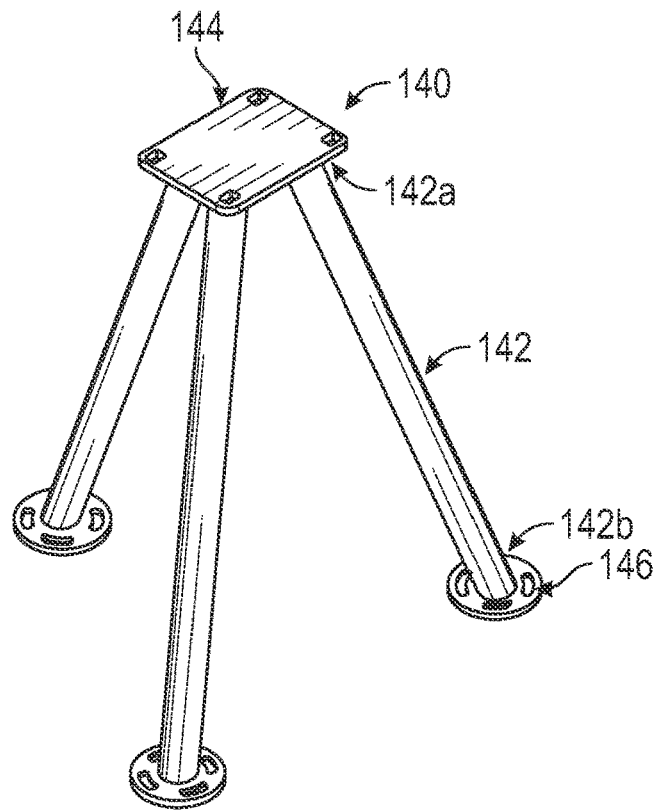
FIG. 20 is a perspective view of still another embodiment of a pier of the solar tracker of FIG. 1.
Figure 21:
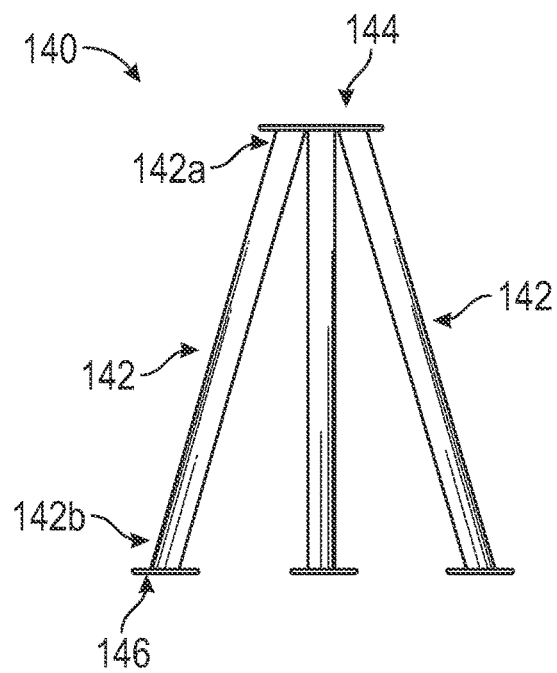
FIG. 21 is an elevation view of the pier of FIG. 20.

With reference to FIGS. 20 and 21, yet another embodiment of a pier is illustrated and generally identified by reference numeral 140. The pier 140 includes a plurality of legs 142, a motor plate 144, and a plurality of flanges 146 corresponding to each of the plurality of legs 142. Each of the plurality of legs 142 includes an elongate body extending between opposed first and second end portions 142a and 142b, respectively. The elongate body of the plurality of legs 142 defines a generally linear profile, although it is contemplated that the elongate body of the plurality of legs 142 may include any suitable profile. The first end portion 142a of the plurality of legs 142 is coupled to a portion of the motor plate 144 such that the plurality of legs 142 define an angle relative thereto (e.g., disposed in a splayed or spread apart configuration). In this manner, the motor plate 144 is maintained in a generally horizontal configuration while the plurality of legs 142 extend therefrom at an outward angle. It is envisioned that the plurality of legs 142 is coupled to the motor plate 144 using any suitable means, such as fasteners, welding, adhesives, amongst others. Each of the plurality of legs 142 is coupled to the motor plate 144 in a spaced apart fashion (e.g., radially spaced apart at an angle relative to one another), and in one non-limiting embodiment, three legs 142 are coupled to the motor plate at an angle of 120 degrees relative to one another to form a generally tripod type configuration, although it is contemplated that any suitable angle may be formed between the plurality of legs 142 and the angle formed between adjacent legs 142 may be the same or different than angles formed between other adjacent legs 142. As can be appreciated, any number of legs 142 may be utilized, such as four, five, six, etc.

The motor plate 144 is configured to be selectively coupled to a slew drive (not shown) or other motor utilized in the solar tracker 10 to effectuate movement of the torque tube 12 and thereby, the solar panels 14. The second end portion 142b of the plurality of legs is coupled to a respective flange 146 using any suitable means, such as fasteners, welding, adhesives, amongst others. The plurality of flanges 146 is configured to couple the pier 140 to a portion of a pier driven into the soil.

Turning to FIGS. 22-25, still another embodiment of a pier is illustrated and generally identified by reference numeral 150. The pier 150 includes a first A-frame 152, a second A-frame 154, and a motor bracket 156. Each of the first and second A-frames 152 is substantially similar to the pier 90, and therefore, the first and second A-frames 152, 154 will not be described in detail herein in the interest of brevity.

The motor bracket 156 includes a top plate 158, a first support plate 160, and a pair of second support plates 162. The top plate 158 defines a generally planar profile including a top surface 158a, an opposed, bottom surface 158b, opposed first and second end surfaces 158c and 158d extending between the top and bottom surfaces 158a, 158b, and opposed side surfaces 158e and 158f extending between each of the opposed first and second end surfaces 158c, 158d and the top and bottom surfaces 158a, 158b. The top plate 158 is configured to be selectively coupled to a slew drive (not shown) or other motor utilized in the solar tracker 10 to effectuate movement of the torque tube 12 and thereby, the solar panels 14.

The first support plate 160 is disposed on the bottom surface 158b of the top plate 158 adjacent the first end surface 158c and extends at a generally right angle therefrom. The first support plate 160 defines a generally rectangular configuration and includes a generally planar profile, although it is contemplated that the first support plate 160 may include any suitable configuration, such as square, trapezoidal, circular, oval, amongst others. It is envisioned that the first support plate 160 may be coupled to the top plate 158 using any suitable means, such as fasteners, welding, adhesives, or the like.

The pair of second support plates 162 is disposed on the bottom surface 158b of the top plate 158 at a substantially center portion of the top plate 158 and extending at a generally right angle therefrom. The pair of second support plates 162 is disposed at a generally perpendicular angle relative to the first support plate 160 to form a generally T-shaped profile, although it is contemplated that the pair of second support plates 162 may be disposed at any angle relative to the first support plate 160. The pair of second support plates 162 are disposed in spaced relation to one another to form a first channel 164 therebetween and are disposed in spaced relation to the first support plate 160 to form a second channel 166 therebetween. Each of the pair of second support plates 162 defines a generally rectangular configuration and includes a generally planar profile, although it is contemplated that the one or both of the pair of second support plates 162 may include any suitable configuration, such as square, trapezoidal, circular, oval, amongst others. It is envisioned that the pair of second support plates 162 may be coupled to the top plate 158 using any suitable means, such as fasteners, welding, adhesives, or the like.

Figure 22:
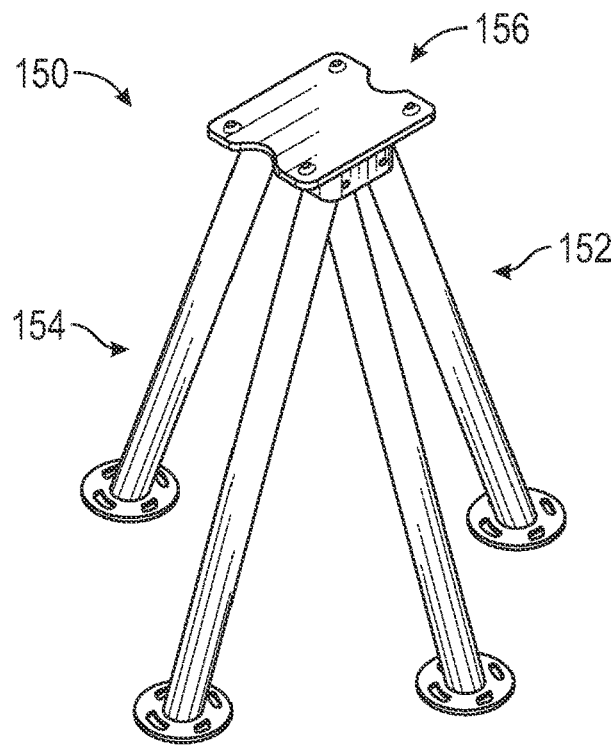
FIG. 22 is a perspective view of yet another embodiment of a pier of the solar tracker of FIG. 1.
Figure 23:
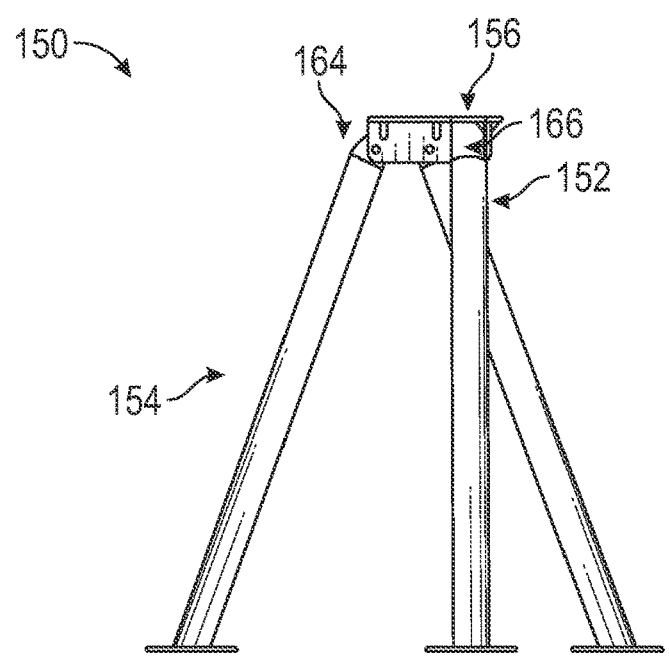
FIG. 23 is an elevation view of the pier of FIG. 22.
Figure 24:
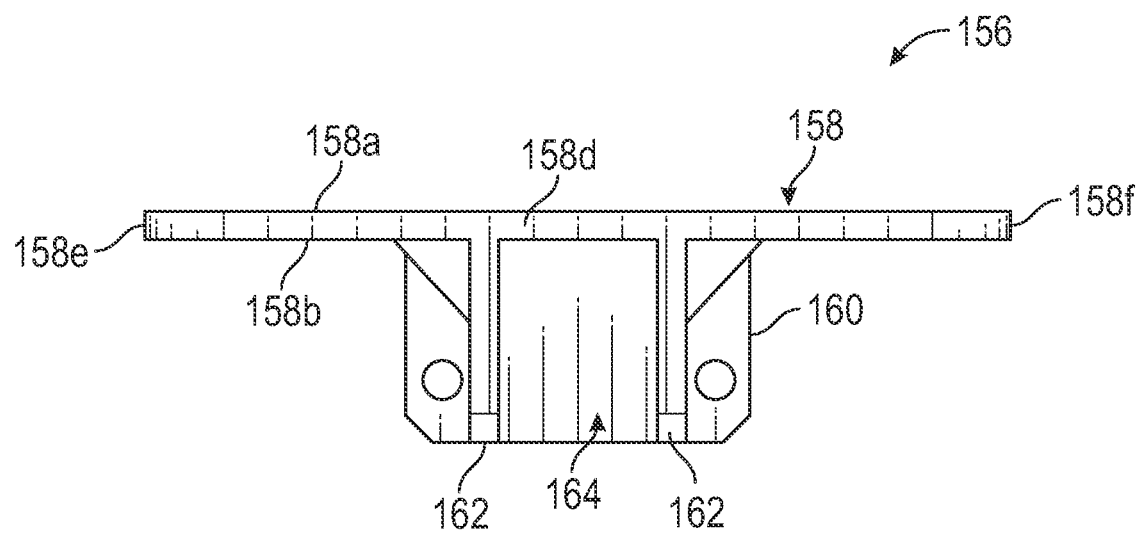
FIG. 24 is a front, elevation view of a motor mount of the pier of FIG. 22.
Figure 25:
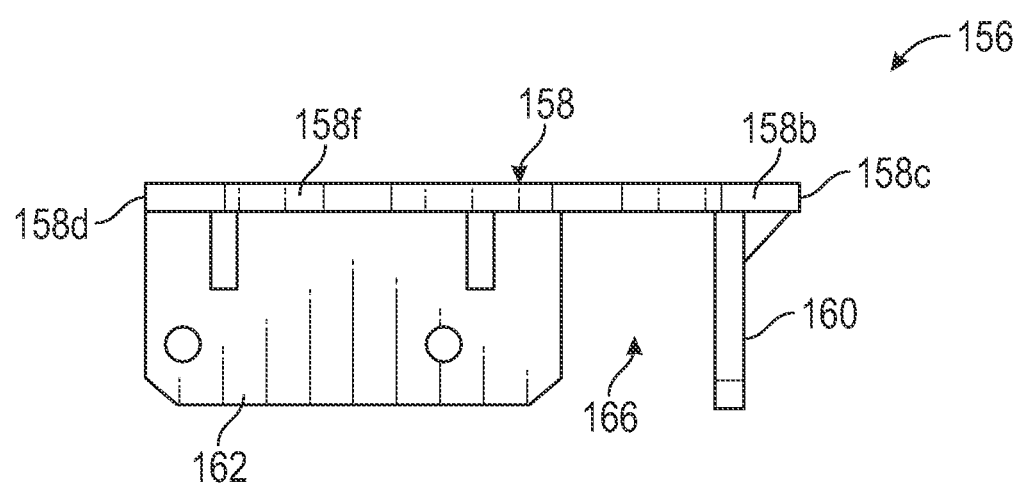
FIG. 25 is a side, elevation view of the motor mount of FIG. 24.
Figure 26:
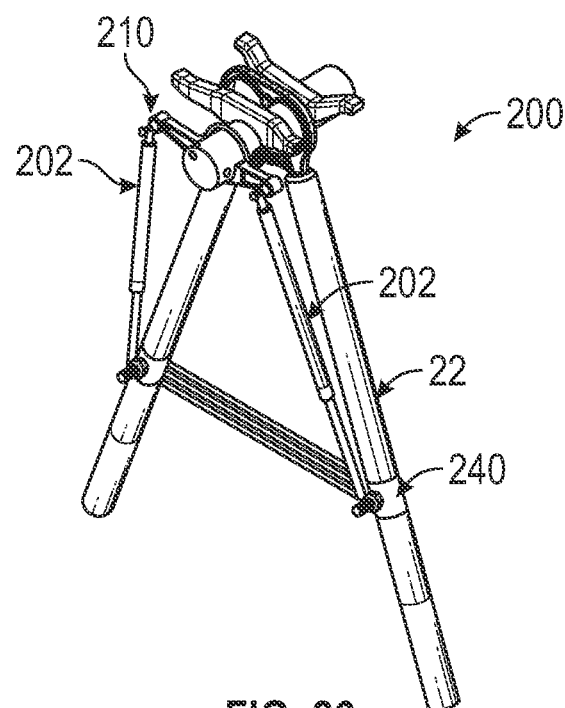
FIG. 26 is a perspective view of a damper assembly of the solar tracker of FIG. 1.
Figure 27:
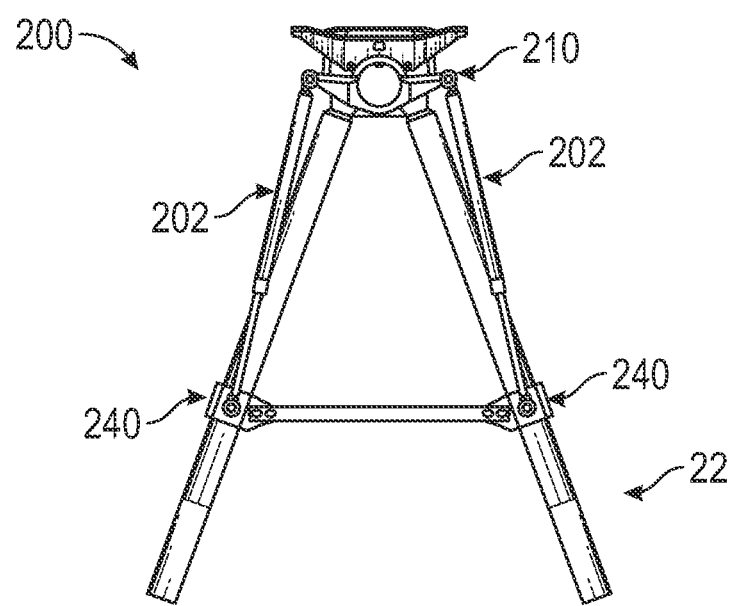
FIG. 27 is an elevation view of the damper assembly of FIG. 26.
Figure 28:
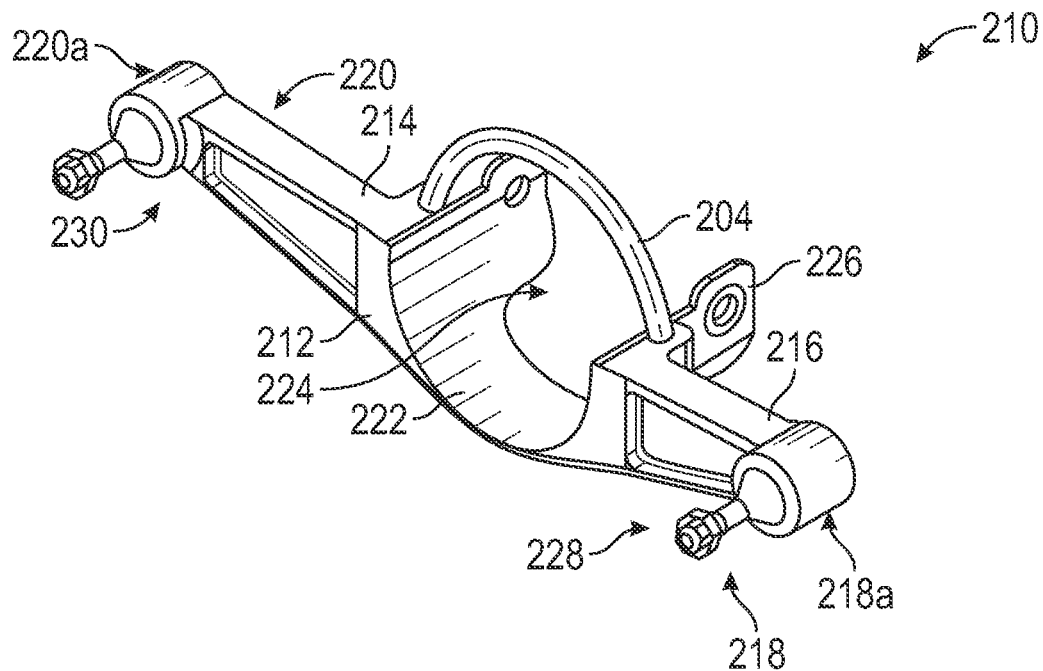
FIG. 28 is a perspective view of an upper damper mount of the damper assembly of FIG. 27.
Figure 29:
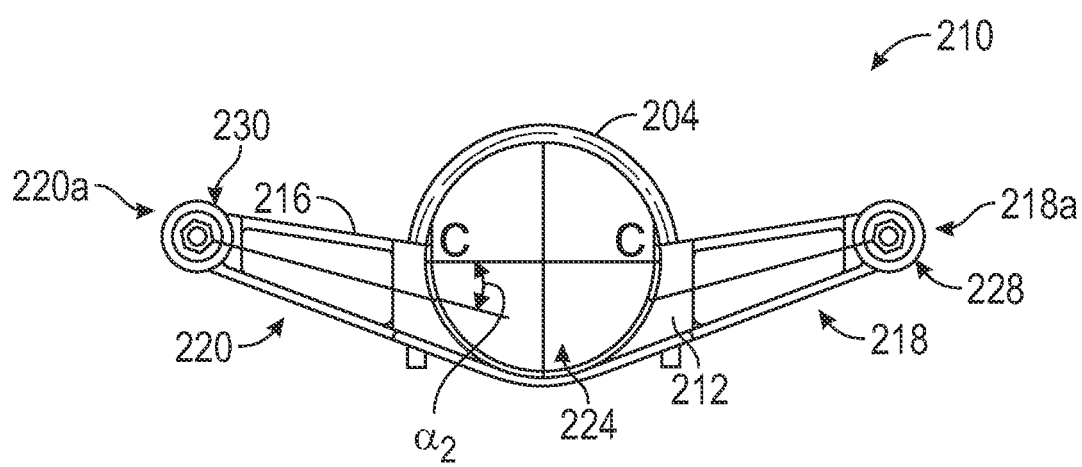
FIG. 29 is an elevation view of the upper damper mount of FIG. 28.
Figure 30:
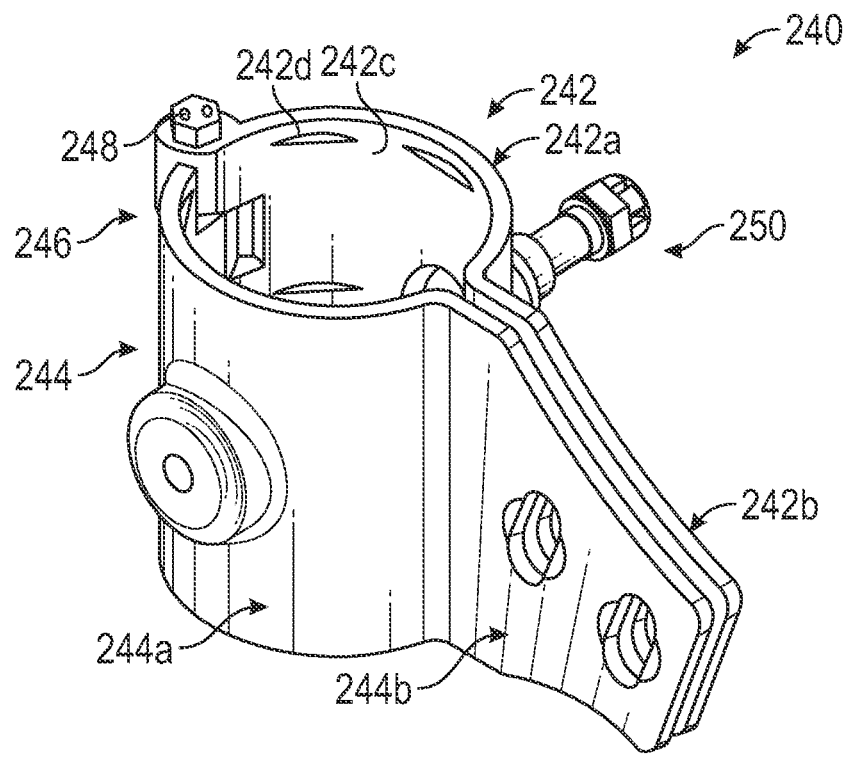
FIG. 30 is a perspective view of a lower damper mount of the damper assembly of FIG. 27.

With continued reference to FIGS. 22 and 23, a crown of the first A-frame 152 is received within the second channel 166 of the motor bracket 156 and a crown of the second A-frame 154 is received within the first channel 164 of the motor bracket 156 and each is coupled to the respective first support plate 160 and pair of second support plates 162 using any suitable means, such as fasteners, welding, adhesives, amongst others. In this manner, the first and second A-frames 152, 154 are disposed in a T-shaped configuration, although it is contemplated that he first and second A-frames 152, 154 may be disposed in any suitable configuration depending upon the orientation of the first support plate 160 relative to the pair of second support plates 162.

With reference to FIGS. 26-36, a damper assembly for use with the solar tracker 10 is illustrated and generally identified by reference numeral 200. The damper assembly 200 includes a pair of struts 202, an upper damper mount 210, and a pair of lower damper mounts 240.

The upper damper mount 210 includes first and second side surfaces 212, 214 disposed in spaced relation to one another and an outer surface 216 extending between each of the first and second side surfaces 212, 214. The upper damper mount 210 includes a pair of wings 218, 220 disposed in spaced relation to one another such that the upper damper mount 210 defines a generally arcuate or boomerang type configuration extending between respective first and second end portions 218a and 220a, respectively, although it is contemplated that the upper damper mount 210 may define any suitable configuration, such as planar, amongst others. In one non-limiting embodiment, each of the pair of wings 218, 220 form an angle $\alpha_2$ of 15-degrees with respect to a horizontal axis C-C, although it is envisioned that any suitable angle may be formed relative to the horizontal axis C-C.

An inner surface 222 defines a groove 224 extending through each of the first and second side surfaces 212, 214 and only one portion of the outer surface 216. In this manner, the groove 224 defines a generally U-shaped profile, although it is contemplated that the groove 224 may define any suitable profile, such as square, rectangular, V-shaped, hexagonal, amongst others. The groove 224 is configured to receive a portion of a torque tube 12 therein such that the torque tube 12 may be selectively coupled thereto using a U-bolt 204 or other suitable bracket or fastener. In embodiments, the upper damper mount 210 may include a pair of tabs 226 extending from one of the first or second side surfaces 212, 214 that is configured to selectively couple the upper damper mount 210 to a respective bearing housing assembly 40 and provide additional rigidity.

The upper damper mount 210 includes a pair of posts 228 and 230, respectively, disposed on each respective wing of the pair of wings 218, 220 adjacent each respective first and second end portions 218a, 220a. The pair of posts 228, 230 is configured to be selectively coupled to a respective strut of the pair of structs 202 using any suitable means, such as fasteners, welding, adhesives, amongst others. In one non-limiting embodiment, the pair of posts 228, 230 is a bolt coupled to the upper damper mount.

With reference to FIGS. 30-33, the pair of lower damper mounts 240 is substantially similar, and therefore, only one lower damper mount 240 will be described in detail herein in the interest of brevity. The lower damper mount 240 defines a generally clamshell configuration having first and second half-sections 242 and 244, respectively. The first and second half-sections 242, 244 each include a tubular center portion 242a and 244a, respectively, and a planar tab portion 242b and 244b, respectively, coupled to each respective tubular center portion 242a, 244a. Although generally described as being separate components, it is contemplated that the tubular center portions 242a, 244a and the planar tab portions 242b, 244b may be formed from a unitary component by means of forming (e.g., bending or the like). The planar tab portions 242b, 244b cooperate to enable the first and second half-sections 242, 244 to be clamped together or otherwise maintained in a second, closed position by means of fasteners, welding, adhesives, amongst others.

Figure 33:
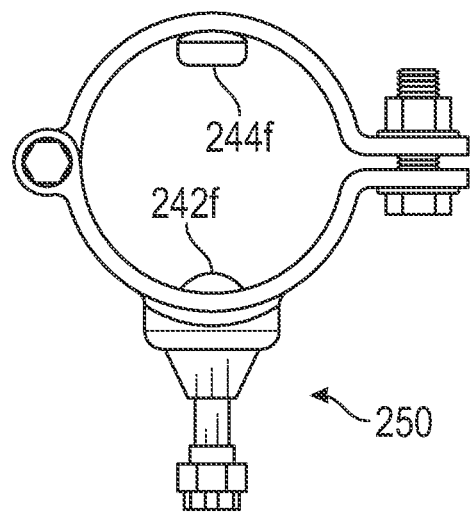
FIG. 33 is a plan view of still another embodiment of the lower damper mount of FIG. 30.

An interior surface 242c and 244c of each of the tubular center portions 242a, 244a includes a plurality of protuberances 242d, 244d disposed thereon. The plurality of protuberances 242d, 244d cooperate to provide increased clamping force on a portion of a pile 22 and inhibit rotation, translation, or relative movement of the lower damper mount 240 relative thereto. In embodiments, the interior surfaces 242c, 244c may not include a plurality of protuberances, but rather, one or both of the interior surfaces 242c, 244c may include a single dimple 242f disposed thereon (FIG. 32) to inhibit rotation and translation of the lower damper mount 240 relative to the pile 22 or in embodiments, may include a pair of dimples 242f, 244f, each disposed on a respective interior surface 242c, 244c (FIG. 33).

Each of the first and second half sections 242, 244 is joined together using a hinge 246 or other suitable formation (e.g., a plurality of interlocking cylinders) including a hinge pin 248 selectively retained therein to enable relative motion of the first and second half sections 242, 244 from a first, open configuration, to a second, closed or clamped configuration. In one non-limiting embodiment, the hinge pin 248 is a bolt including a nut, although it is contemplated that any suitable means may be utilized to hingedly couple the first and second half sections 242, 244 to one another.

Figure 31:
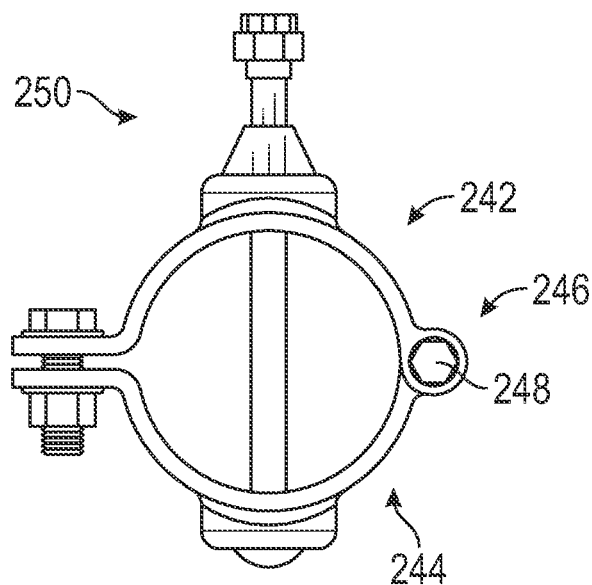
FIG. 31 is a plan view of another embodiment of the lower damper mount of FIG. 30.
Figure 32:
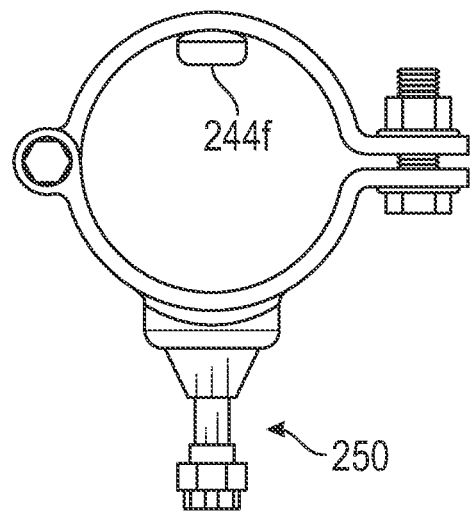
FIG. 32 is a plan view of yet another embodiment of the lower damper mount of FIG. 30.

An outer surface 242e, 244e of one or both of the tubular center portions 242a, 244a of the first and second half sections 242, 244 includes a post 250 disposed thereon and extending therefrom. The post 250 is configured to be selectively coupled to a portion of a respective strut of the pair of struts 202 such that the strut 202 is coupled to the upper damper mount 210 at a first end portion thereof and to the lower damper mount 240 at a second end portion thereof. In this manner, rotation of the torque tube 12 effectuates a corresponding rotation of the upper damper mount 210, which causes the strut 202 to compress or extend between the upper damper mount 210 and the lower damper mount 240, depending on the direction of rotation of the torque tube 12. It is envisioned that the post 250 may be a bolt, threaded rod, stud, amongst others. In one non-limiting embodiment, the post 250 may be replaced with a bolt that passes entirely through both of the first and second half sections 242, 244 (FIG. 31). In this embodiment, the interior surface 242c and 244c of each of the tubular center portions 242a, 244a may not include the plurality of protuberances 242d, 244d, as the bolt 250 will pass through a portion of the pile 22 to inhibit rotation and translation of the lower damper mount 240 relative thereto.

Figure 34:
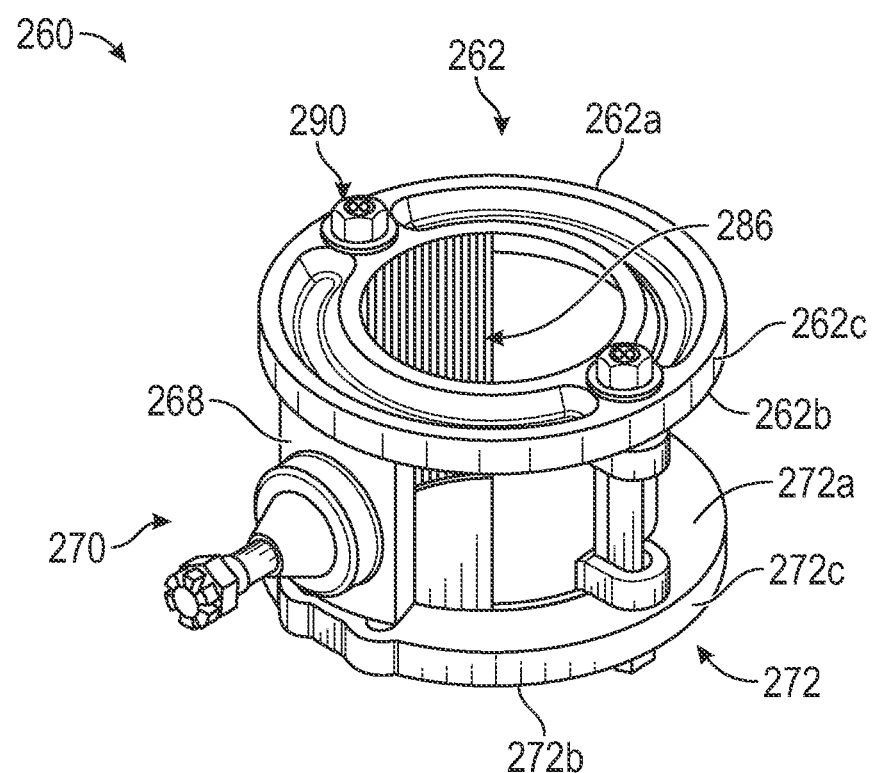
FIG. 34 is a perspective view of yet another embodiment of the lower damper mount of FIG. 30.
Figure 35:
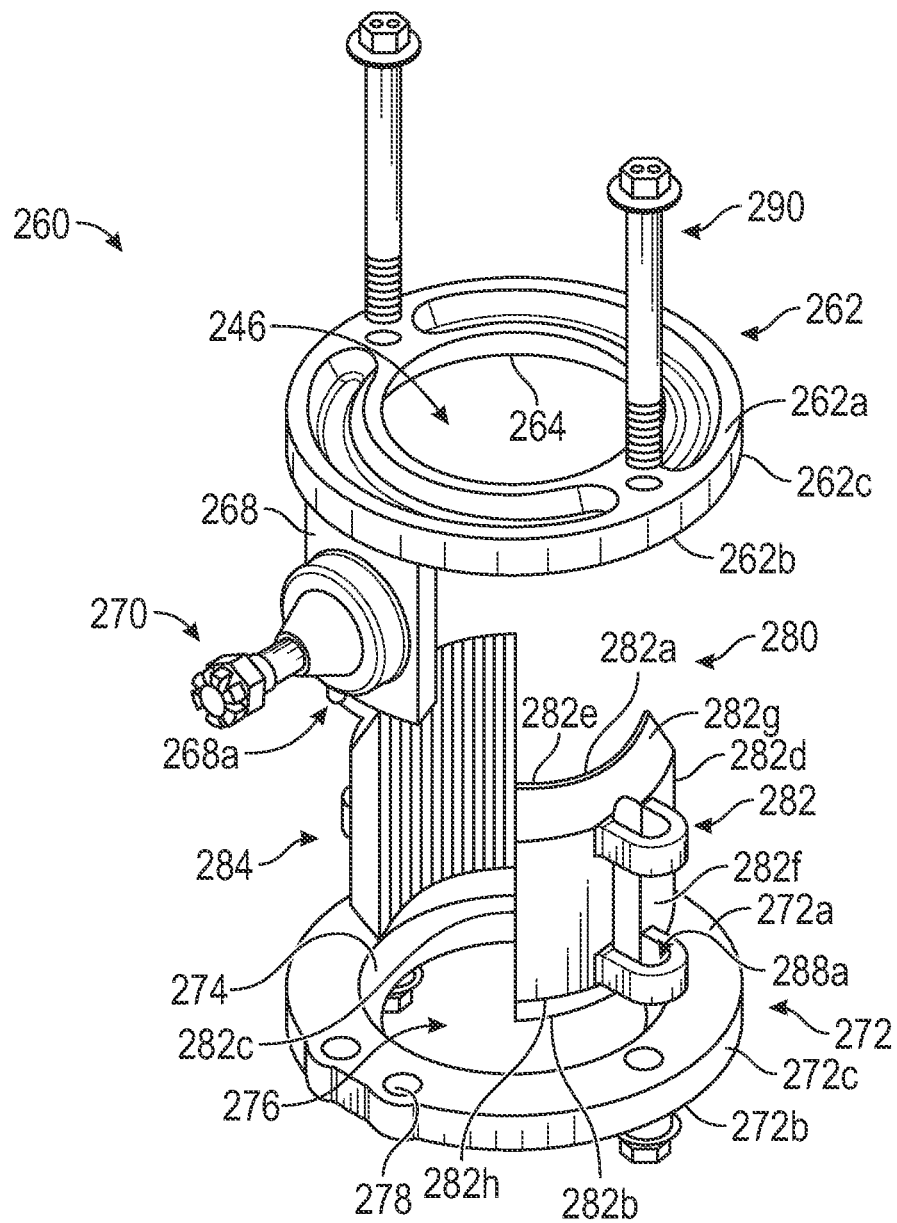
FIG. 35 is an exploded, perspective view of the lower damper mount of FIG. 34.
Figure 36:
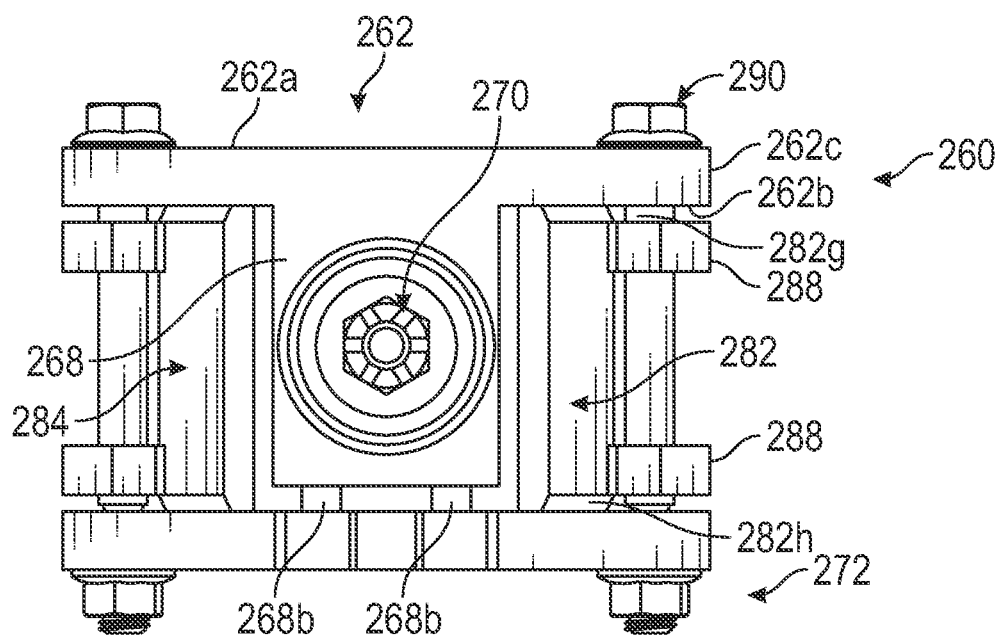
FIG. 36 is an elevation view of the lower damper mount of FIG. 34.

With reference to FIGS. 34-36, still another embodiment of a lower damper mount is illustrated and generally identified by reference numeral 260. The lower damper mount 260 includes an upper plate 262, a lower plate 272, and a split collet 280.

The upper plate 262 defines a generally planar profile having opposed upper and lower surfaces 262a and 262b, respectively, and an outer surface 262c extending therebetween. An inner surface 264 defines a bore 266 through each of the upper and lower surfaces 262a, 262b that is configured to receive a portion of a pile 22 therethrough. The inner surface 264 defines a tapered profile extending from a center portion of the upper plate 262 towards the outer surface 262c as the inner surface 264 transitions from the upper surface 262a to the lower surface 262b. The upper plate 262 includes a tab 268 disposed on the lower surface 262b adjacent the outer surface 262c and extending from the lower surface 262b and terminating at an end portion 268a. It is envisioned that the tab may be formed as a unitary component with the upper plate 262 (e.g., machined, folded, etc.) or may be formed as a separate component that is coupled to the upper plate 262 using any suitable means, such as fasteners, welding, adhesives, amongst others. The tab 268 includes one or more protuberances 268b disposed on the end portion 268a and extending therefrom. The protuberances 268b are configured to engage a corresponding feature on the lower plate 272 to maintain alignment of the upper and lower plates 262, 272, as will be described in further detail hereinbelow.

The tab 268 includes a post 270 disposed thereon that is configured to be selectively coupled to a portion of a strut 202. It is envisioned that the post 270 may be a bolt, threaded rod, stud, etc. and may be coupled to the tab using any suitable means, such as threadably engagement, welding, adhesives, amongst others. In one non-limiting embodiment, the post 270 is integrally formed (e.g., machined) with the tab 268.

The lower plate 272 defines a generally planar profile having opposed upper and lower surfaces 272a and 272b, respectively, and an outer surface 272c extending therebetween. An inner surface 274 defines a bore 276 through each of the upper and lower surfaces 272a, 272b that is configured to receive a portion of a pile 22 therethrough. The inner surface 274 defines a tapered profile extending from adjacent the outer surface 272c towards a center portion of the lower plate 272 as the inner surface 274 transitions from the upper surface 272a to the lower surface 272b (e.g., in an opposite direction to the inner surface 264 of the upper plate 262). The tapered profiles of the inner surfaces 264, 274 of the upper and lower plates 262, 272, respectively, cooperate to cause the split collet 280 to be driven towards a center portion of the upper and lower plates 262, 272 and clamp or otherwise inhibit movement of the lower damper mount 260 relative to the pile 22 captured therein, as will be described in further detail hereinbelow.

The upper surface 272a defines one or more dimples 278 therein corresponding to the one or more protuberances 268b of the upper plate 262, such that as the upper plate 262 is placed in relation to the lower plate 272, the one or more protuberances 268b are received within the corresponding one or more dimples 278 to inhibit translation or rotation of the upper and lower plates 262, 272 relative to one another. Although generally described as being a dimple, it is contemplated that the one or more dimples 278 may pass entirely through both the upper and lower surfaces 272a, 272b of the lower plate 272.

Continuing with FIGS. 34-36, the split collet 280 include first and second half sections 282 and 284, respectively, each of which is substantially similar one another, and therefore, only one half section 282 will be described in detail herein in the interest of brevity. The half section 282 defines a generally arcuate profile extending between opposed upper and lower surfaces 282a, 282b, opposed first and second side surfaces 282c and 282d extending between the upper and lower surfaces 282a, 282b, and opposed inner and outer end surfaces 282e and 282f extending between each of the upper and lower surfaces 282a, 282b and the first and second side surfaces 282c, 282d. The outer surface 282f includes respective first and second tapered portions 282g and 282h adjacent the upper surface 282a and the lower surface 282b, respectively. The first tapered portion 282g tapers from position adjacent the inner surface 282e towards the outer surface 282f in a direction from the upper surface 282a towards the lower surface 282b. The second tapered portion 282h tapers from the outer surface 282f to a position adjacent the inner surface 282e in a direction from the upper surface 282a towards the lower surface 282b. In this manner, the half section 282 includes a thickness that is thinner adjacent each of the upper and lower surfaces 282a, 282b and thicker at a center portion thereof.

The first and second tapered portions 282g, 282h cooperate with the respective inner surfaces 264, 274 of the upper and lower plates 262, 272, such that as the upper and lower plates 262, 272 are drawn towards one another, the tapered profiles of the inner surfaces 264, 274 of the upper and lower plates abut the tapered portions 282g, 282h, respectively, to cause the half section 282 to translate towards a center portion of the lower damper mount 260 and clamp or otherwise compress against a portion of the pile 22 disposed therein to inhibit movement of the lower damper mount 260 relative to the pile 22.

The inner surface 282e of the half section 282 includes a plurality of ribs or crenellations 286 thereon. As can be appreciated, the crenellations 286 engage and outer surface of the pile 22 to help mitigate movement of the lower damper mount 260 relative to the pile 22 when the pile 22 is received between the split collet 280. It is envisioned that the crenellations 286 may be integrally formed with the half section 282, may be a separate component that is coupled to the inner surface 282e of the half section using fasteners, welding, adhesives, amongst others, or may be otherwise captured using pins or the like.

The outer surface 282f of the half section 282 includes a pair of hoops 288 disposed thereon that is configured to slidaby receive a pair of fasteners 290. The pair of hoops 288 define an elongated hole 288a therein to permit the half section 282 to translate in a perpendicular direction relative to the fastener 290. In this manner, the pair of fasteners pass through a portion of the upper plate 262, through the elongated holes 288a of the pair of hoops 288, and through a portion of the lower plate 272 to align or otherwise maintain an orientation of the upper plate 262, split collet 280, and lower plate 272 relative to one another. The pair of fasteners 290 cooperate to draw the lower plate 272 towards the upper plate 282 when rotated in a first direction, which causes the tapered inner surfaces 264, 274 of the upper and lower plates 262, 272 abut the tapered portions 282g, 282h of the split collet, respectively, to cause the half section 282 to translate towards a center portion of the lower damper mount 260 and clamp or otherwise compress against a portion of the pile 22 disposed therein to inhibit movement of the lower damper mount 260 relative to the pile 22. Although generally illustrated as having a nut or other suitable component to threadably engage the fastener 290, it is envisioned that the lower plate 272 may include a corresponding pair of threaded holes to threadably engage a portion of the pair of fasteners. It is envisioned that the lower damper mount 260 may include any number of fasteners, such as three, four, five, etc.

Returning to FIGS. 26 and 27, the pair of struts 202 may be any suitable strut capable of providing resistance to compression and/or damping linear movement thereof. In this manner, the pair of struts 202 is releasably coupled to the upper damper mount 210 at a first portion thereof and releasably coupled to the lower damper mount 240 at a second, opposite portion thereof. As the torque tube 12 rotates, the upper damper mount 210 is likewise rotated, which causes one strut of the pair of struts 202 to compress against the lower damper mount 240 and the second strut of the pair of struts 202 to extend between the upper and lower damper mounts 210, 240. In this manner, the pair of struts 202 absorbs some of the torque placed upon the torque tube 12 as the solar panels 14 are likewise rotated, which prevents the torque tube from rotating too quickly and eases the strain placed on the slew drive 18. It is envisioned that the pair of struts 202 may be any suitable strut or damper, such as a gas filled strut, an elastomer strut, spring loaded strut, amongst others.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A damper assembly for use with a solar tracker, comprising:
    an upper damper mount, the upper damper mount operably coupled to a portion of a torque tube of the solar tracker;
    a lower damper mount, the lower damper mount operably coupled to a portion of a pier of the solar tracker, the lower damper mount including an upper plate, a lower plate, and a split collet interposed between the upper plate and the lower plate, the upper plate and the lower plate each having a tapered surface thereon, the tapered surfaces of the upper plate and the lower plate configured to abut corresponding tapered surfaces of the split collet; and
    a strut, the strut operably coupled to the upper damper mount at a first end portion thereof and operably coupled to the lower damper mount at a second, opposite end portion thereof,
    wherein rotation of the upper damper mount effectuates a compression or an extension of the strut between the upper damper mount and the lower damper mount, and
    wherein drawing the upper plate and the lower plate towards one another causes the tapered surfaces of the upper plate and the lower plate to abut the tapered surfaces of the split collet and effectuate a perpendicular translation of the split collet relative to the upper plate and the lower plate.

2. The damper assembly according to claim 1, wherein an interior surface of the split collet defines a plurality of ridges thereon.

3. The damper assembly according to claim 1, wherein an outer surface of the split collet includes a hoop disposed therein, the hoop defining an elongated hole therethrough that is configured to receive a portion of a fastener therein.

4. The damper assembly according to claim 1, wherein the upper plate defines a lower surface, the lower surface including a tab disposed thereon and extending therefrom, the tab including a post disposed thereon that is configured to be operably coupled to a portion of the strut.

5. The damper assembly according to claim 4, wherein the tab includes a protuberance disposed on a lower surface thereof that is configured to be received within a corresponding bore defined in an upper surface of the lower plate to inhibit movement of the upper plate relative to the lower plate.

6. The damper assembly according to claim 1, wherein the perpendicular translation of the split collet effectuated by drawing the upper plate and the lower plate towards one another causes the split collet to clamp the portion of the pier of the solar tracker.

7. A damper assembly for use with a solar tracker, comprising:
    an upper damper mount, the upper damper mount operably coupled to a portion of a torque tube of the solar tracker;
    a lower damper mount, the lower damper mount operably coupled to a portion of a pier of the solar tracker, the lower damper mount including an upper plate and a lower plate, the upper plate defining a lower surface, the lower surface including a tab disposed thereon and extending therefrom, the tab including a post disposed on the tab, the tab including a protuberance extending from a lower portion of the tab, the protuberance configured to be received within a corresponding dimple defined in an upper surface of the lower plate to inhibit movement of the upper plate relative to the lower plate; and
    a strut, the strut operably coupled to the upper damper mount at a first end portion thereof and operably coupled to the lower damper mount at a second, opposite end portion thereof, the strut configured to be operably coupled to the post,
    wherein rotation of the upper damper mount effectuates a compression or an extension of the strut between the upper damper mount and the lower damper mount.

8. The damper assembly according to claim 7, further comprising a split collet interposed between the upper plate and the lower plate.

9. The damper assembly according to claim 8, wherein an interior surface of the split collet defines a plurality of ridges thereon.

10. The damper assembly according to claim 8, wherein an outer surface of the split collet includes a hoop disposed therein, the hoop defining an elongated hole therethrough configured to receive a portion of a fastener therein.

11. The damper assembly according to claim 8, wherein the upper plate and the lower plate each have a tapered surface, wherein drawing the upper plate and the lower plate towards one another causes the tapered surfaces of the upper plate and the lower plate to abut corresponding tapered surfaces of the split collet and effectuate a perpendicular translation of the split collet relative to the upper plate and the lower plate.

12. The damper assembly according to claim 7, wherein the dimple defined in the upper surface of the lower plate passes through the lower plate.

13. The damper assembly according to claim 7, wherein when the protuberance is received within the corresponding dimple, rotation of the upper plate and the lower plate relative to one another is inhibited.

* * * * *